United States Patent
Deaver et al.

(10) Patent No.: US 7,493,499 B1
(45) Date of Patent: Feb. 17, 2009

(54) METHOD AND APPARATUS FOR SECURE DELIVERY AND RIGHTS MANAGEMENT OF DIGITAL CONTENT

(75) Inventors: John Deaver, Manchester, NH (US); Skott C. Klebe, Lexington, MA (US); Woodrow W. Johnson, Marblehead, MA (US)

(73) Assignee: Copyright Clearance Center, Inc., Danvers, MA (US)

( * ) Notice: Subject to any disclaimer, the term of this patent is extended or adjusted under 35 U.S.C. 154(b) by 738 days.

(21) Appl. No.: 10/443,261

(22) Filed: May 22, 2003

(51) Int. Cl.
*H04L 9/00* (2006.01)
(52) U.S. Cl. ...................................... 713/193
(58) Field of Classification Search ............... 705/51; 713/193
See application file for complete search history.

(56) References Cited

U.S. PATENT DOCUMENTS

| | | | |
|---|---|---|---|
| 5,541,993 A | 7/1996 | Fan et al. |
| 5,742,807 A | 4/1998 | Masinter |
| 5,787,179 A | 7/1998 | Ogawa et al. |
| 5,892,900 A | 4/1999 | Ginter et al. |
| 5,949,876 A | 9/1999 | Ginter et al. |
| 5,982,891 A | 11/1999 | Ginter et al. |
| 5,991,399 A | 11/1999 | Graunke et al. |
| 6,087,632 A | 7/2000 | Mizosaki et al. |
| 6,112,181 A | 8/2000 | Shear et al. |
| 6,138,119 A | 10/2000 | Hall et al. |
| 6,157,721 A | 12/2000 | Shear et al. |
| 6,253,193 B1 | 6/2001 | Ginter et al. |
| 6,289,452 B1 | 9/2001 | Arnold et al. |
| 6,292,569 B1 | 9/2001 | Shear et al. |
| 6,363,488 B1 | 3/2002 | Ginter et al. |
| 6,449,721 B1 | 9/2002 | Pensak et al. |

(Continued)

FOREIGN PATENT DOCUMENTS

EP 1 372 055 A2 12/2003

(Continued)

OTHER PUBLICATIONS

Von Faber, Eberhard, et al., "The Secure Distribution of Digital Contents", debis IT Security Services, pp. 16-22, Bonn, Germany.

(Continued)

*Primary Examiner*—Andrew L Nalven
(74) *Attorney, Agent, or Firm*—Law Offices of Paul E. Kudirka

(57) ABSTRACT

A secure distribution system utilizes a content viewer that consists of an applet that is downloaded to a user's conventional browser when the user logs into a publisher's server. The content viewer requests a selected document from the server by referring to the document name or URL. The server retrieves the document and forwards it to the viewer in encrypted form. The viewer then computes a document identifier from the encrypted document and uses the identifier to request a key in order to decrypt the document. The key is forwarded from the server to the viewer that then decrypts the document and displays it in the viewer. Since the document is processed by the viewer and displayed only in a window associated with the viewer, none of the conventional browser functions has to be disabled. Further, since the document is downloaded in encrypted form, it cannot be stored or forwarded using the conventional browser.

37 Claims, 27 Drawing Sheets

U.S. PATENT DOCUMENTS

| | | | |
|---|---|---|---|
| 6,711,594 | B2 | 3/2004 | Yano et al. |
| 6,807,632 | B1 | 10/2004 | Carpentier et al. |
| 6,938,047 | B2 * | 8/2005 | Kryeziu .................. 707/101 |
| 6,976,165 | B1 * | 12/2005 | Carpentier et al. ......... 713/165 |
| 6,996,544 | B2 * | 2/2006 | Sellars et al. ............ 705/51 |
| 7,017,188 | B1 | 3/2006 | Schmeidler et al. |
| 7,035,826 | B2 | 4/2006 | Hamada et al. |
| 7,062,045 | B2 * | 6/2006 | Riddick et al. ............ 380/44 |
| 7,073,199 | B1 | 7/2006 | Raley |
| 7,095,853 | B2 | 8/2006 | Morishita |
| 7,103,574 | B1 * | 9/2006 | Peinado et al. ............ 705/51 |
| 7,171,567 | B1 * | 1/2007 | Bayer et al. ............. 713/193 |
| 2002/0002541 | A1 | 1/2002 | Williams |
| 2002/0013772 | A1 | 1/2002 | Peinado |
| 2002/0073033 | A1 * | 6/2002 | Sherr et al. ............. 705/51 |
| 2002/0146118 | A1 | 10/2002 | DiSanto |
| 2004/0236956 | A1 | 11/2004 | Shen et al. |

FOREIGN PATENT DOCUMENTS

| | | |
|---|---|---|
| WO | WO 01/09703 A1 | 2/2001 |
| WO | WO 01/41018 A2 | 6/2001 |
| WO | WO 02/100037 A1 | 12/2002 |

OTHER PUBLICATIONS

U.S. Appl. No. 10/621,705, filed Jul. 17, 2003, Klebe et al.
U.S. Appl. No. 10/615,278, filed Jul. 8, 2003, Deaver et al.

* cited by examiner

000
METHOD AND APPARATUS FOR SECURE DELIVERY AND RIGHTS MANAGEMENT OF DIGITAL CONTENT

FIELD OF THE INVENTION

This invention relates to electronic commerce and publishing of digital content and to methods and systems for secure delivery and rights management of digital content, including text and images in various formats.

BACKGROUND OF THE INVENTION

Global distribution systems, such as the Internet, are increasingly being used for distribution of digital content that includes text and graphic information encoded in a variety of formats. However, copyright holders and publishers of such digital content have been slow to embrace the use of the Internet for distribution of digital content because it has been difficult to control unauthorized copying and dissemination of the content once it has been delivered onto the Internet. In particular, once content has been placed in digital form and delivered to a user, it can easily be copied, printed or forwarded to other users.

Thus, providers of digital content desire to establish a secure, global distribution system for digital content that protects the rights of the content's copyright holders. One prior art technique for controlling the distribution of digital content is shown in FIG. 1. In this technique, unencrypted content is placed in a server farm that is located behind a secure firewall. A user, such as user 100 desiring access to the content stored in database 106 logs in to the server 104 using a conventional authentication scheme, such as a password or subscription service. Once connected to the server 104, an authorized user 100 can view content and request a copy of that content as indicated by arrow 108. In response to this request, the server 104 retrieves the information from the database 106 as indicated schematically by arrow 110 and displays the content.

This conventional protection technique has several drawbacks. First, many users prefer to view the content with a conventional web browser. In order to display the content in such a browser, it is necessary to download a digital version of the content, as indicated schematically by arrow 112. This digital version is typically stored, at least temporarily, in the computer, and can be printed or forwarded to other users. Therefore, in accordance with another prior art technique, in order to view the content, the conventional browser must be equipped with a plug-in, ActiveX components or another program which controls the browser and disables the printing function and prevents forwarding the content to unauthorized users. However, in order to use this system, it is necessary to first download and install the plug-in, the ActiveX libraries or other program, before the content can be viewed. In addition, since the content is not encrypted when it is downloaded to the browser, it can still be stored and then later printed or forwarded to other users.

Another problem with this conventional system is that the content sits behind a firewall and it is not directly accessible from the Internet. Consequently, the content cannot be easily cataloged and indexed by conventional search tools, such as search engines or web crawlers. This cuts off a source of potential revenue for the content provider from users who might be interested in the material if they were made aware of it. In addition, locating the content behind a firewall forces authorized users to log in to the server before they can conduct a search for selected material.

Another conventional protection technique is called a "secure container" system. In this system, the content is delivered to the user in an encrypted form and is decrypted at the user's site by means of a decryption key. This technique provides a solution to protecting the document during delivery over insecure channels, but does not provide any mechanism to prevent legitimate users from obtaining the plaintext document and then copying or redistributing it.

In addition, the secure container system requires a way to securely distribute decryption keys for the content. Since the decryption keys and the encrypted content must inevitably both be delivered to an uncontrolled machine, it is important that the key delivery process be as robust as possible. In one conventional embodiment of the secure container system, a key pair is used to encrypt and decrypt the content. For example, the publisher can use the public key of a key pair assigned to the user to encrypt the content. The user then uses the private key of the key pair to decrypt the encrypted content. The problem with this arrangement is that the publisher must encrypt each content document when the user requests it. Since the key pair is specific to a user, the publisher cannot encrypt the content before it is requested.

An alternative to key pairs in a secure container system is to use a single key or key pair that is specific to each content document rather than each user. In this manner, that publisher can encrypt the content ahead of time. In response to a user request for a document and after pre-specified authorization conditions have been met, the decryption key for the requested document is provided to a program in the user's computer that decrypts the content for presentation to the user. However, such a system is only as secure as the key distribution arrangement. Further, since the decryption keys must be associated with the corresponding documents, this association is subject to discovery especially if the content server is located in an uncontrolled environment.

Still another prior art technique uses a software device driver that is permanently installed as part of the operating system. This driver attempts to detect usage of the content wherever it may appear in memory and decrypt it from within the operating system kernel. The advantage of this approach is the ability to do without plug-ins or ActiveX controls specific to each application that requires access to the content, such as the browser, the word processor, and other applications. Disadvantages include the level of system access required to perform an installation of the driver into the operating system as well as the risk of introducing overall system instability and hardware platform incompatibility. An example of this approach is the system offered by elisar.com.

In still another approach, instead of using plug-ins for existing browsers or applications, such as word processors, a separate standalone viewer is used for all protected content. In particular, a separate viewer application that can decrypt and present the encrypted content is permanently installed in the computer of the content user. This approach reduces the development work and software distribution required to make the solution available while still offering the advantages of the prior art techniques. The disadvantage of the approach is the difficulty of getting the user community to adopt a new software application for one kind of work in addition to the tools already in use. This approach is common among e-book readers such as Microsoft Reader.

SUMMARY OF THE INVENTION

In accordance with the principles of the invention, a content distribution system in the form of a multi-tier software application enables publishers to disseminate electronic documents and meter their usage, even as the documents are securely shared among a diverse user base. The application offers a measure of document security, preventing untracked document usage by means of end-to-end encryption of content. The application supports display, sharing, bookmarking, and printing of content in a variety of formats without requiring the user to install a plugin or other program into the user's conventional browser system.

In one embodiment, a secure distribution system utilizes a content viewer that consists of an applet that is downloaded to a user's conventional browser when the user logs into a publisher's server. The content viewer requests a selected document from the server by referring to the document name or URL. The server retrieves the document and forwards it to the viewer in encrypted form. The viewer then computes a document identifier from the encrypted document content and uses the identifier to request a key from the server in order to decrypt the document. The key is forwarded from the server to the viewer, which then decrypts the document and displays it in the viewer. Since the document is processed by the viewer and displayed only in a window associated with the viewer, none of the conventional browser functions has to be disabled. Further, since the document is downloaded in encrypted form, it cannot be stored or forwarded using the conventional browser.

In one embodiment, documents are stored in encrypted form on the publisher's server and the document identifier is computed by the server from the encrypted content and stored with the decryption key. The document identifier is computed so that it identifies the encrypted file, but cannot be derived from the encrypted data in the file alone.

In another embodiment, the metrics server software is hosted by a third party, called an application service provider. One or more publishers periodically upload new content to the application service provider and this content is processed by a publishing tool located at the application service processor in order to generate encrypted content. The encrypted content is stored in databases at the application service provider location. In this embodiment, a document identifier is computed by the metrics server at the application service provider site from the encrypted content and stored with the decryption key. Users interested in receiving the content log into the metrics server at the application service provider site as described above. During the login procedure, secure content viewer software is downloaded into the user's browser. The content viewer requests a selected document from the application service provider server by referring to the document name or URL. The server retrieves the document and forwards it to the viewer in encrypted form. The viewer then computes a document identifier from the encrypted document content and uses the identifier to request a key from the server in order to decrypt the document. The key is forwarded from the server to the viewer, which then decrypts the document and displays it in the viewer.

In still another embodiment, the user can elect to store encrypted content locally on his or her computer. For example, the content may be delivered by CDs or DVDs. In order to view the content, the user must log in to a metrics key server located at the publisher's site or another central location. During the login procedure, the secure content viewer software is downloaded over the network into the user's browser as with the previous embodiments. In response to information from the user identifying a document, the content viewer reads the encrypted content from the local machine, and computes a document identifier from the encrypted content. The viewer then sends the document identifier to the key server in order to retrieve decryption keys from the networked key server. The decryption keys are then used to decrypt the encrypted content in the secure viewer software.

In yet another embodiment, the encrypted content and the secure viewer software are stored on the user's local computer. In this embodiment, decryption keys may also be stored in encrypted form on the user's computer. Alternatively, the decryption keys may be retrieved from a networked key server as described in the previous embodiment.

BRIEF DESCRIPTION OF THE DRAWINGS

The above and further advantages of the invention may be better understood by referring to the following description in conjunction with the accompanying drawings in which.

DETAILED DESCRIPTION

The inventive content distribution system, which is called hereinafter a "metrics system", can be configured to run in one of two modes, including a publisher-hosted mode and a distributed mode. In the publisher-hosted mode, the entire distribution system is located at the publisher's premises, whereas in the distributed mode portions of the distribution system are located on the user's premises. These modes are described in more detail below. A content publisher chooses the configuration that best meets its desired business model, and deploys or configures the application software accordingly.

Figure 1:
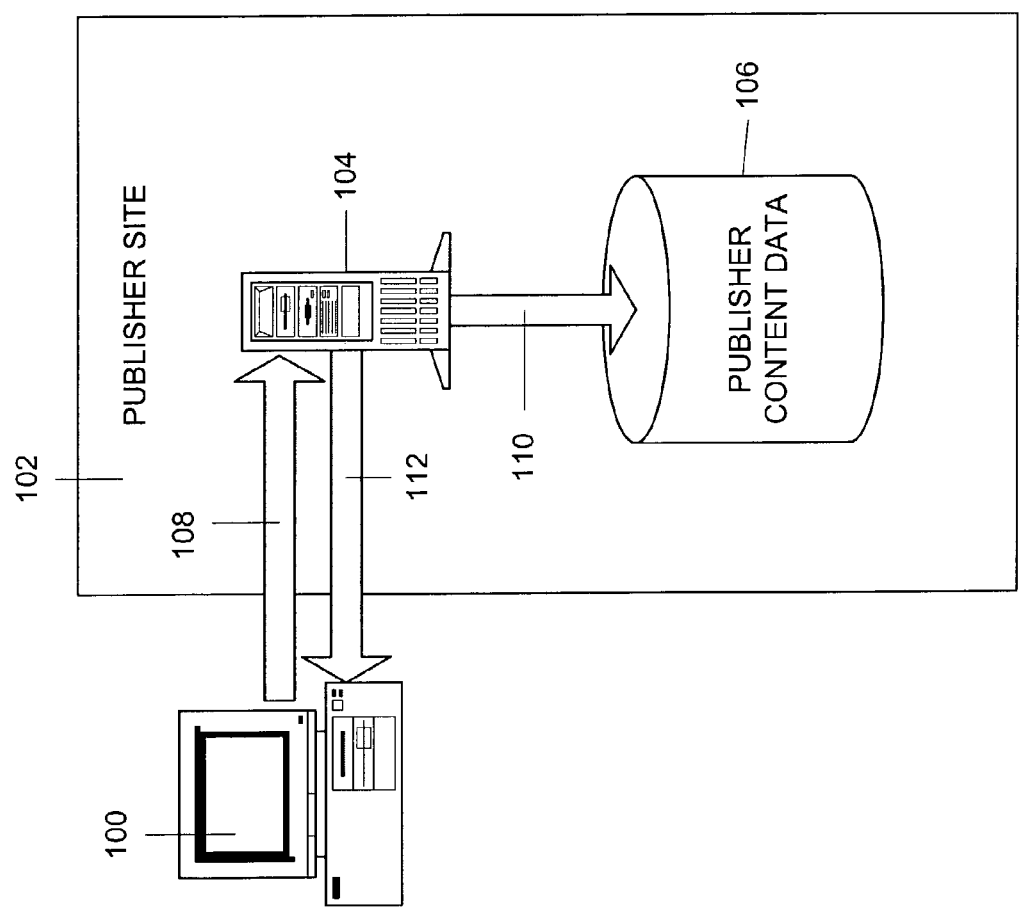
FIG. 1 illustrates a conventional content delivery system in which unencrypted content is located behind a firewall in a publisher server farm.
Figure 2:
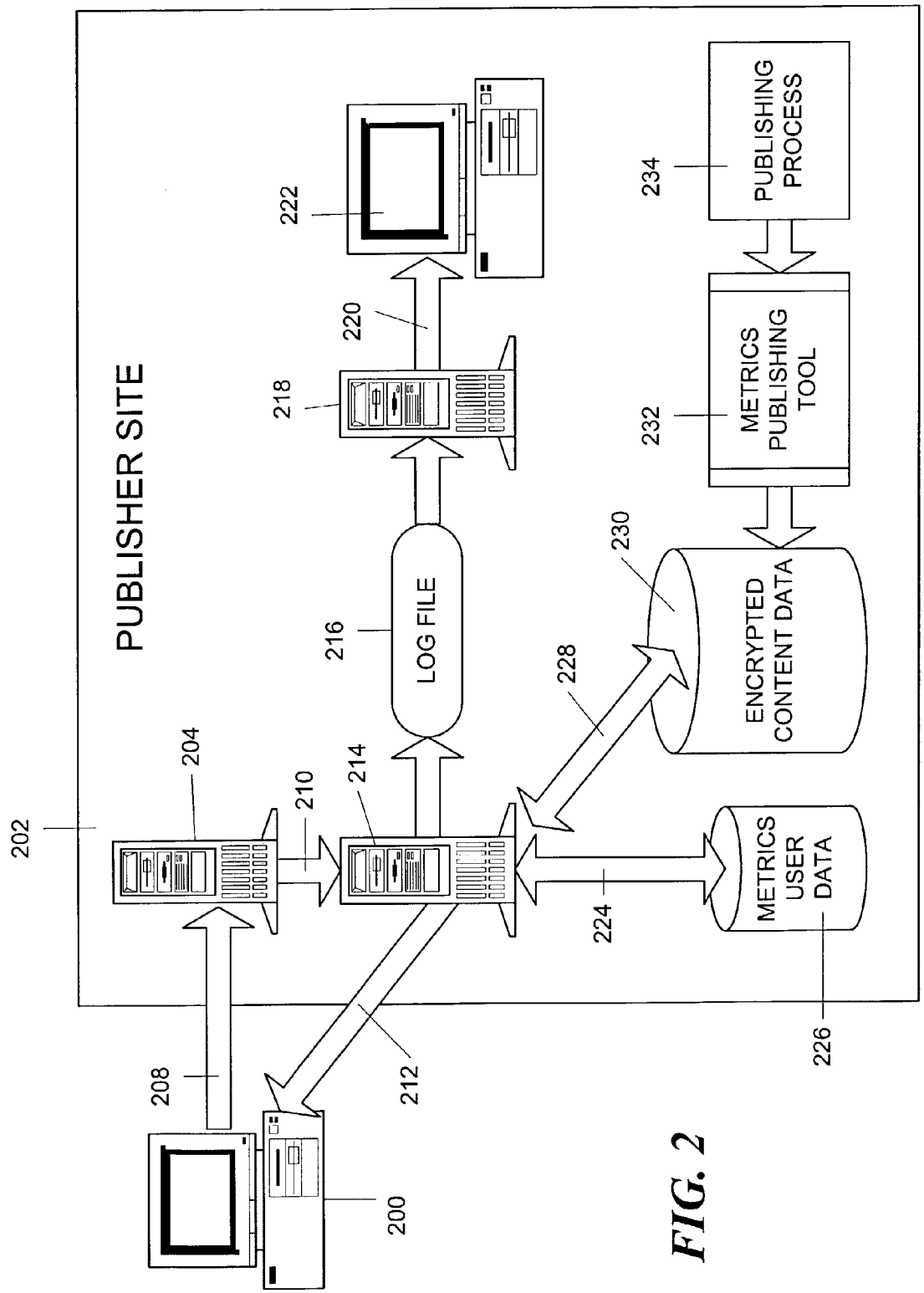
FIG. 2 illustrates one embodiment of the invention in which a metrics server located at a publisher's site receives requests for content from the publisher's server and delivers encrypted content to a viewer located in a user browser.

A block schematic diagram of the content distribution system configured in the publisher-hosted mode is shown in FIG. 2. A user operating a workstation 200 accesses the distribution system over a network through a conventional browser program. Browser programs that are suitable for use with the invention include Microsoft Internet Explorer, Netscape, Opera or other Java 1.1 compatible browsers. Using the browser, the user requests a document either by a file name or by a URL as indicated schematically by arrow 208. This request is received in the publisher's location 202 by the publisher's content server 204. However, rather than accessing the content data 230 directly as in the prior art, the publisher's content server 204 refers the request to a metrics content server 214 as indicated schematically by arrow 210. The metrics content server 214 provides access to the publisher's content stored in database 230. It also creates a log file 216 that records various user activities, including login to the system, registration, creation of a user profile and the reading and printing of selected content.

The contents of log file 216 can be extracted and formatted by a metrics reporting server 218 and provided to a reporting client 222 as indicated schematically by arrow 220.

More specifically, the first time a user 200 accesses the metrics contents server 214, a registration file is created. This file includes user identifying information, such as a user ID and a password, that the user will utilize to access the system. This information is stored in a metrics user database 226 as indicated schematically by arrow 224. The information in the metrics user database 226 is used later to authenticate users who are requesting access to the publisher content.

The metrics content server 214 interacts with a publisher content database 230 as indicated by arrow 228. Each piece of content in the publisher content database 230 has been processed by encrypting the document and providing a unique identifier called an object identifier (OID) that uniquely identifies that piece of content. This processing is performed by a metrics publishing tool 232 that receives the output of the publisher's conventional publishing process 234. The metrics publishing tool encrypts documents for distribution via the distribution system. The process takes content files (and optionally content metadata files) as input and generates an encrypted document package, document identifier and key data as output. The encrypted output is generated in one of two forms depending on the configuration of the distribution system.

Document level encryption is used when the metrics content server is running at the publisher's own trusted site. In this case, the encryption can be performed in a batch process in order to protect entire collections of content in a single off-line operation. Alternatively, individual files can be dynamically encrypted as they are requested. Distribution level encryption can be used when a portion of the distribution system is running at a customer site. In the distribution-level encryption model, the publisher performs batch processing on content to prepare encrypted bundles or archives that contain document collections. The archives can then be distributed to customers either on portable media, such as compact disks, or via network downloads, for example, via the FTP protocol.

Figure 3:
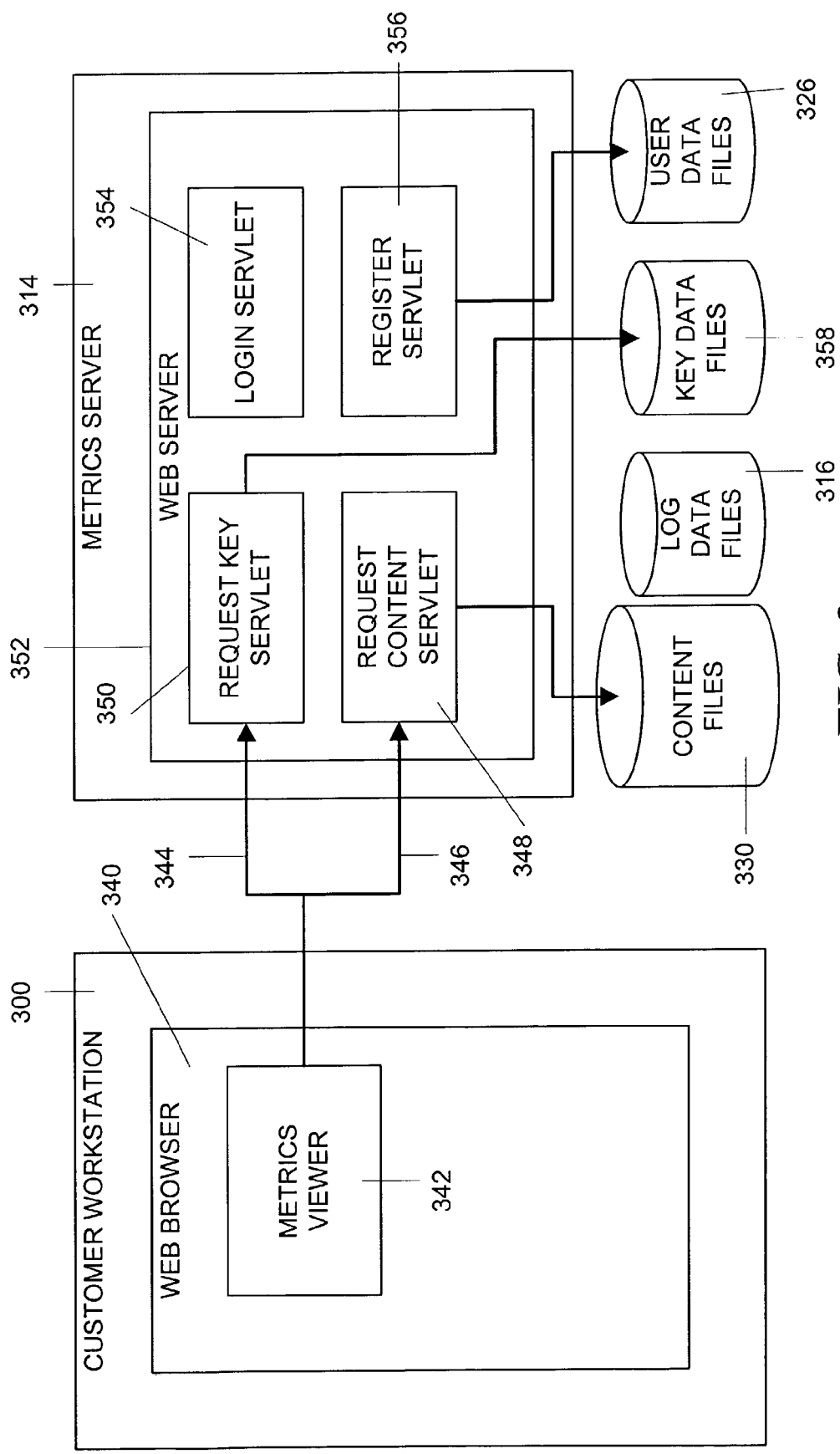
FIG. 3 is a block schematic diagram that shows a more detailed view of the viewer and the architecture of the metrics server.
Figure 4A:
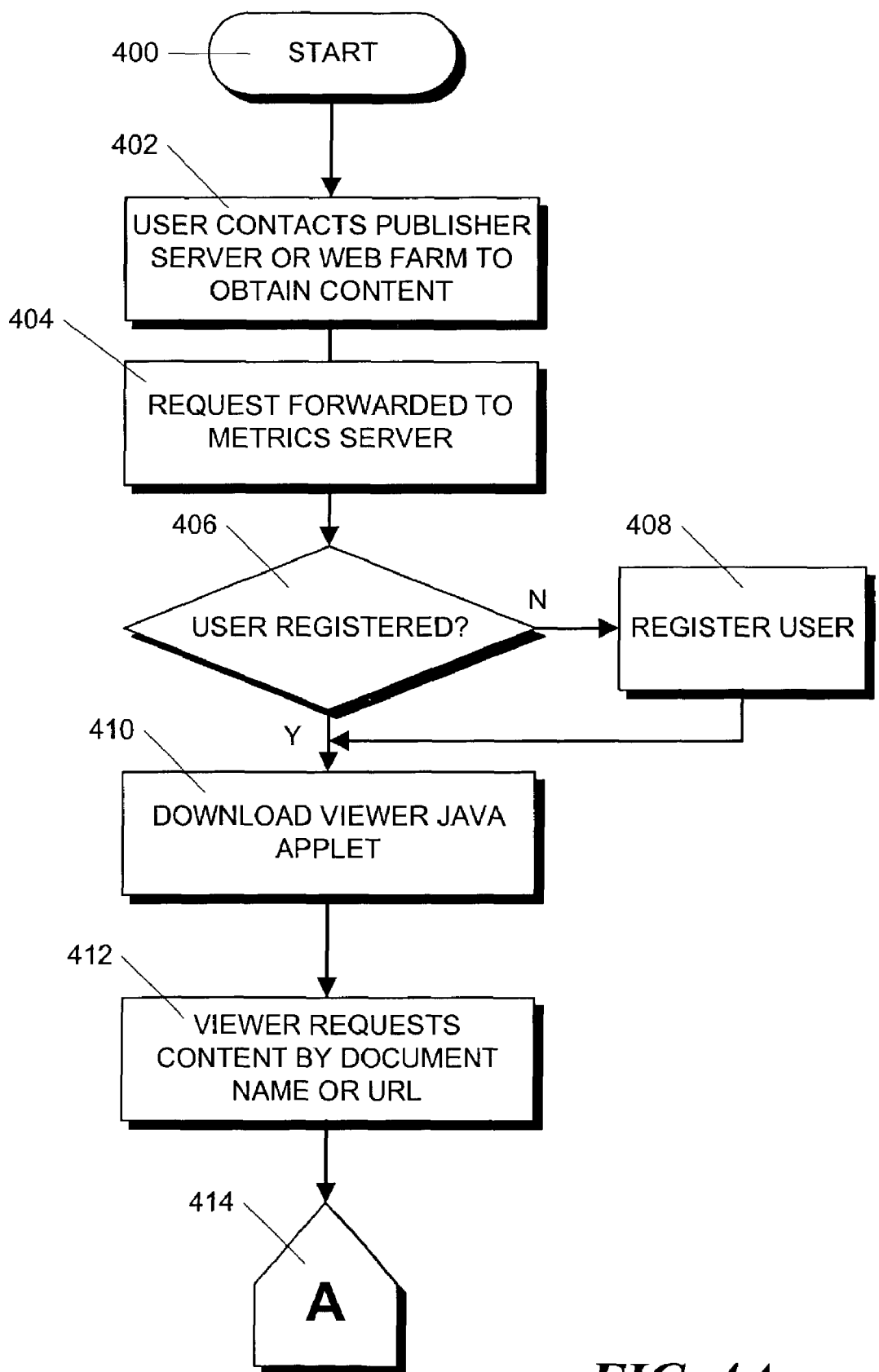
FIGS. 4A and 4B, when placed together, form a flowchart showing the steps of an illustrative process by which a user logins into to a metrics server, downloads and views content.
Figure 4B:
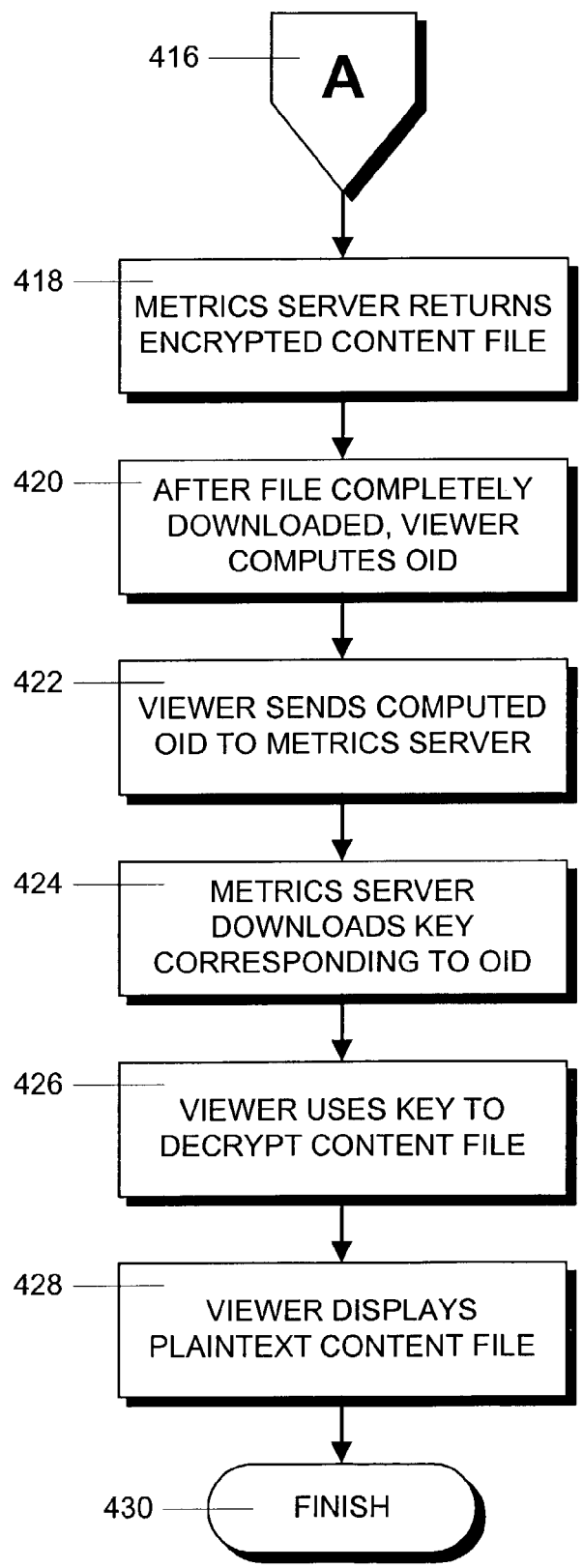

In either the publisher-hosted or the distributed modes, a user accesses the content in the same manner. FIG. 3 shows a more detailed schematic block diagram illustrating the system components involved in a typical request and delivery of content. In this figure, a user at user workstation 300 interacts with a metrics server 314 that could be located at a publisher or user premises by means of a conventional web browser 340 running the work station 300. The steps involved in this process are illustrated in FIGS. 4A and 4B which, when placed together, form a flowchart illustrating the request and delivery of content with the inventive system.

As shown in FIG. 3, the metrics server 314 hosts a web server 352, which actually performs the functions of login, registration and delivery of encrypted content and corresponding decryption keys. This web server can be a conventional web server that acts as a container for a collection of servlets that actually perform the processing. Web server software suitable for use with the present invention is the Tomcat web server available from the Apache Software Foundation, 1901 Munsey Drive, Forest Hills, Md. 21050-2747.

Servlets are programs that run within the web server and process requests from an HTTP client. The servlet container that is bundled with the Tomcat web server supports all servlet activity. In this architecture, the servlet container provides the appropriate libraries to process requests. The servlet container contains four main servlets that perform login, registration and content transfer. These include the login servlet 354, the register servlet 356, the request content servlet 348 and the request key servlet 350. The operation of these servlets is described in conjunction with the flowchart illustrated in FIGS. 4A and 4B.

The content request and delivery process begins in step 400 and proceeds to step 402 where a user desiring a presentation of selected content contacts a publishing service or a web farm to request the content by means of a file name or URL or other identifier. In step 404, this request is forwarded to the metrics server 314.

In step 406, the metrics server uses the login servlet 354 to determine whether the user has previously registered with the system. If not, the register servlet 356 is used to update the user data files 326, create a user profile and register the user as set forth in step 408.

After the user has been registered, the metrics server 314 downloads a metrics viewer applet to the web browser 340 operating in the user workstation 300. The metrics viewer 342 is an applet that retrieves and displays secured contents from the metrics server 314. In one embodiment, this applet is a Java applet that operates in conventional browsers. The metrics viewer allows users to access content as they do in their familiar browser environments including reading, printing and emailing of content to other users while retaining control of the content. In a preferred embodiment of the viewer, the list of content use features can be changed by customization. For example, publishers preferring not to allow printing can customize the viewer applet to disable or eliminate the printing feature. In general, the viewer prevents storage of content by preventing storage of the information to the user's storage devices, such as a hard drive.

In one embodiment, the metrics viewer supports the following features: (1) navigation within individual articles and overall navigation from article to article, (2) setting bookmarks to favorite articles, (3) e-mailing an article to a list of e-mail addresses, (4) printing selected articles, (5) logging into the metrics server and registering with the server, and (6) searching by means of a search engine located within the metrics server in installations that support server searching. These operations are initiated by a viewer GUI that includes buttons for each operation. These buttons are trapped so that user activities can be logged as discussed below.

It should be noted that the content is only displayed in a window that is controlled by the viewer and that the viewer does not use any of the standard browser functions. Therefore, the standard browser buttons or menu selections do not affect the display or manipulation of the displayed content and need not be disabled. For example, since the content is displayed only in a window controlled by the viewer, selection of the conventional print function in the browser will print only the content portion displayed in the viewer window and not the entire content document.

After the viewer has been downloaded, the user can then use the viewer 342 to locate desired content. A content article could be identified, for example, by document name or URL. In step 412, the metrics viewer 342 interacts with the request content servlet 348, as indicated schematically by arrow 346, to request a content document. The process then proceeds, via off-page connectors 414 and 416, to step 418 where the request content servlet 348 uses the provided document name or URL to retrieve an encrypted content file from the content files database 330. The metrics server then downloads the encrypted file to the metrics viewer 342.

As set forth in step 420, after the encrypted file has been completely downloaded, the viewer 342 computes the OID for the document. This content identifier is calculated using the encrypted content itself. Although the content identifier can be calculated in many ways, it is important that the identifier cannot be calculated from the content alone. Therefore, the content identifier is related to the content, but not directly derivable from the content.

Figure 5:
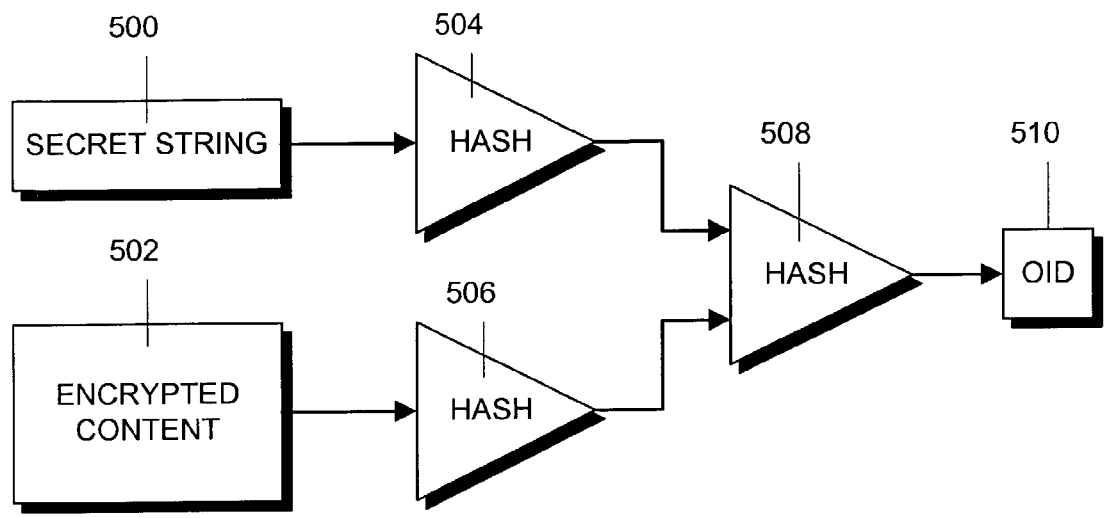
FIG. 5 is a block schematic diagram of apparatus for calculating an object identifier.
Figure 6:
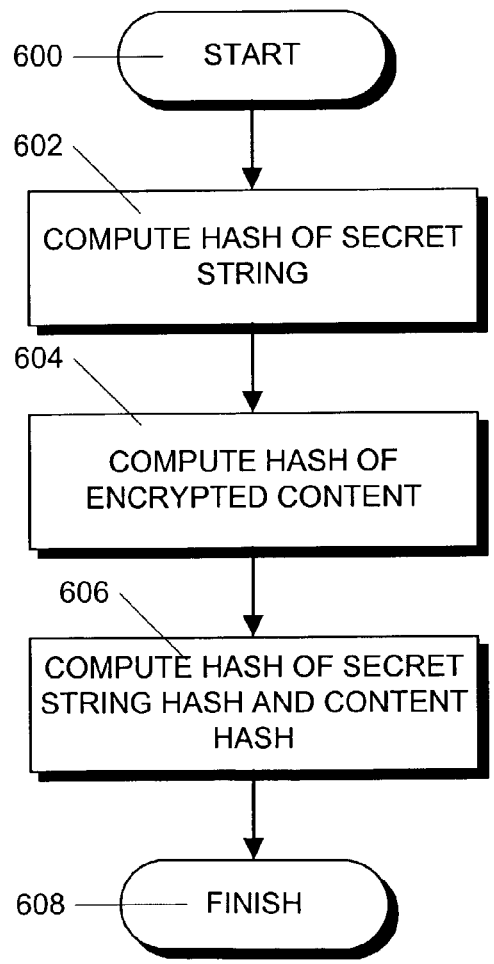
FIG. 6 is a flowchart showing the steps of an illustrative process for calculating an object identifier using the apparatus of FIG. 5.

An exemplary architecture and process for calculating the OID are shown in FIGS. 5 and 6, respectively. The process begins in step 600 and proceeds to step 602 where a hash of a secret string 500 is calculated with a one-way hashing mechanism 504. The secret string is embedded in the viewer code so that it is downloaded when the viewer is downloaded. The secret string may be obfuscated in the viewer code in a conventional manner to deter reverse engineering of the viewer code.

The one-way hashing algorithm used by mechanism 504 to create this hash, for example, may be an SHA-1 secure hashing algorithm as described in FIPS 180-1 at the web site located at URL http://www.itl.nist.gov/fipspubs/fip 180-1.htm. Then, in step 604, a hash of the encrypted content item 502 is computed, using, for example, the SHA-1 hashing algorithm in one-way hashing mechanism 506. In step 606, the hash computed in step 602 is hashed with the hash computed in step 604 using, for example, the SHA-1 algorithm again in hashing mechanism 508. The process then ends in step 608. The resulting OID value 510 is mathematically likely to be unique to the particular encrypted file, and cannot be derived from the data in the file alone.

Returning to FIG. 4B, in step 422, the viewer requests a key for decrypting the file using the OID computed from the encrypted content. In particular, the metrics viewer 342 sends the OID to the request key servlet 350 as indicated schematically by arrow 344. The request key servlet 350 retrieves a decryption key from the key database 358 using the OID to access the database. As set forth in step 424, the metric server then downloads the requested decryption key corresponding to the OID to the metrics viewer 342. Next, as set forth in step 426, the viewer 342 uses the key to decrypt the encrypted content file. Finally, as set forth in step 428, the viewer 342 presents the plaintext content file in the web browser 340. The process then finishes in step 430.

In order to operate in the manner set forth in FIGS. 4A and 4B, the content files must first be encrypted and the OIDs generated. As mentioned previously, the encryption is performed by a metrics publishing tool. The steps in this process are set forth in FIG. 7 and the internal architecture of the tool is shown in FIG. 8. The metrics publishing tool is responsible for encrypting the publisher's content and packaging it for distribution. The publishing tool could consist of a command-line utility, controlled through configuration files. Alternatively, it is possible to customize the publisher's publishing environment so that the publishing tool is called through an application programming interface (API).

The publishing process involves encrypting content and providing identifiers for the encrypted content, generating decryption keys and linking the identifiers and the decryption keys so that the decryption key for a requested content document can be located. In order to provide the greatest level of flexibility and the highest level of security the encryption and key management implementations obey the following principles:

1. All encryption algorithms used are established, popular algorithms that are well-understood and believed to be strong. Examples include the Blowfish algorithm, which is a symmetric block cipher that takes a variable-length key, from 32 bits to 448 bits. This algorithm is described in an article entitled "Description of a New Variable-Length Key, 64-Bit Block Cipher (Blowfish)", B. Schneier, *Fast Software Encryption, Cambridge Security Workshop Proceedings* (December 1993), Springer-Verlag, 1994, pp. 191-204. Another example is the RSA public key algorithm of which details are available in the Public Key Cryptography Standard (PKCS #1) of RSA Laboratories at the web site located at URL http://www.rsasecurity.com/rsalabs/pkcs/. The encryption and key management implementation does not rely on particular assumptions about any of the algorithms that it uses; that is, another algorithm, such as the Advanced Encryption Standard (AES, details available at http://csrc.nist.gov/CryptoToolkit/aes/rijndael/), could be substituted for the Blowfish algorithm, an elliptical public key algorithm could be substituted for the RSA public key algorithm, and so on.

2. All keys are exchanged with a secure protocol. Such a protocol is the Diffie-Hellman key exchange protocol that is described in PKCS #3 available at RSA Laboratories at the web site located at URL http://www.rsasecurity.com/rsalabs/pkcs/.
3. Encrypted content and its decryption key are never stored or delivered together in the same file or transmission. The decryption key for a content package is delivered either at a different time from the content package, or through a different channel.
4. The relationship between an encrypted content item and its decryption key is never stored. If an encrypted object has an identifier, then the number for its decryption key is derived through a cryptographically strong algorithm. In one embodiment, this algorithm is a variant of a one-way hash such as the aforementioned SHA-1 hash.
5. The system uses as few explicit identifiers as possible. For example, the identifier for a content item is not stored anywhere in the system; instead, the content identifier is calculated from a variant of the encrypted form of the content using a secure hash.
6. There are no plaintext strings in the program object code that can be used directly to compromise the security of the content.

Figure 7:
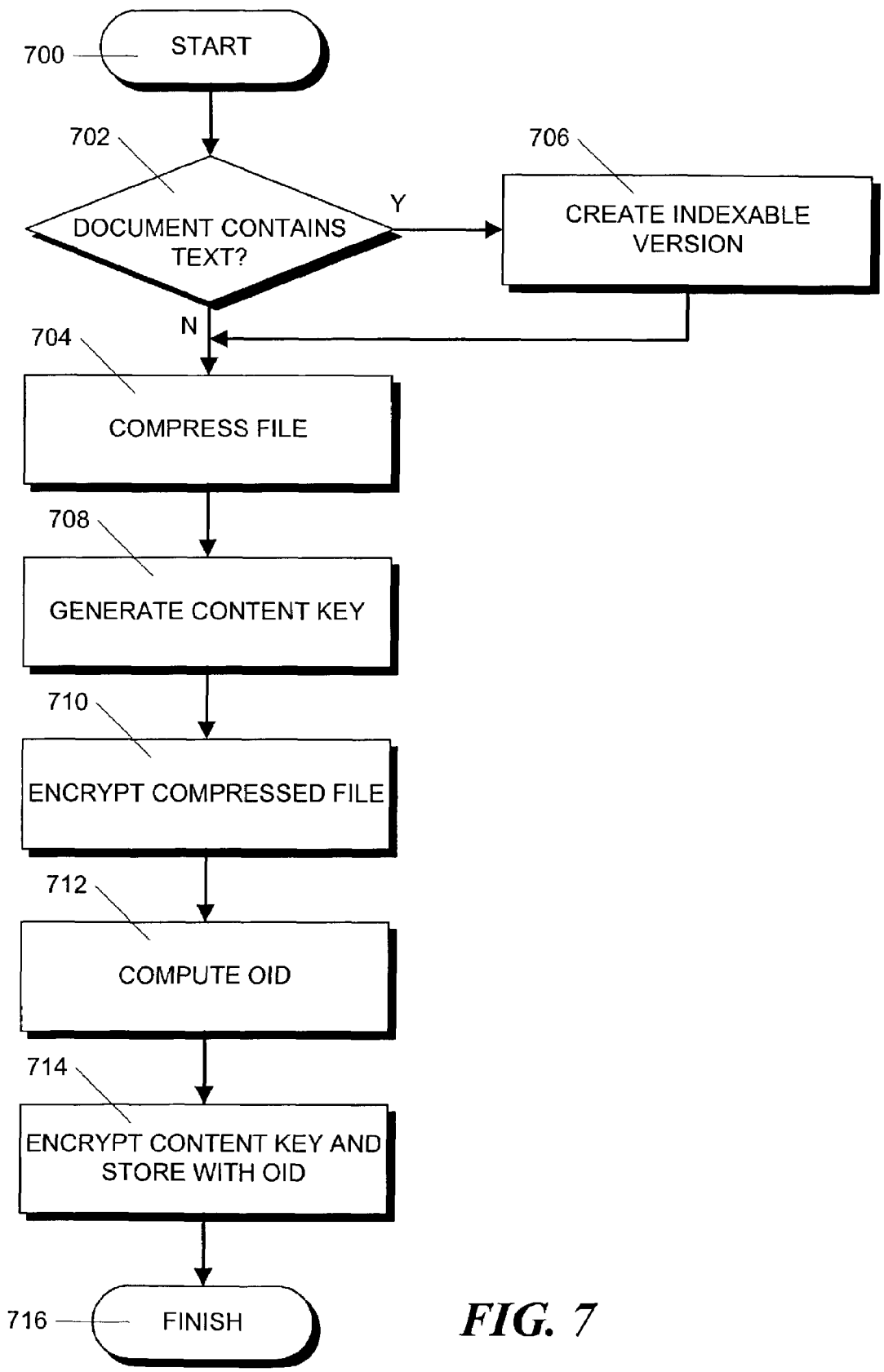
FIG. 7 is a flowchart showing the steps of an illustrative process by which a metrics publishing tool prepares a single document for distribution.
Figure 8:
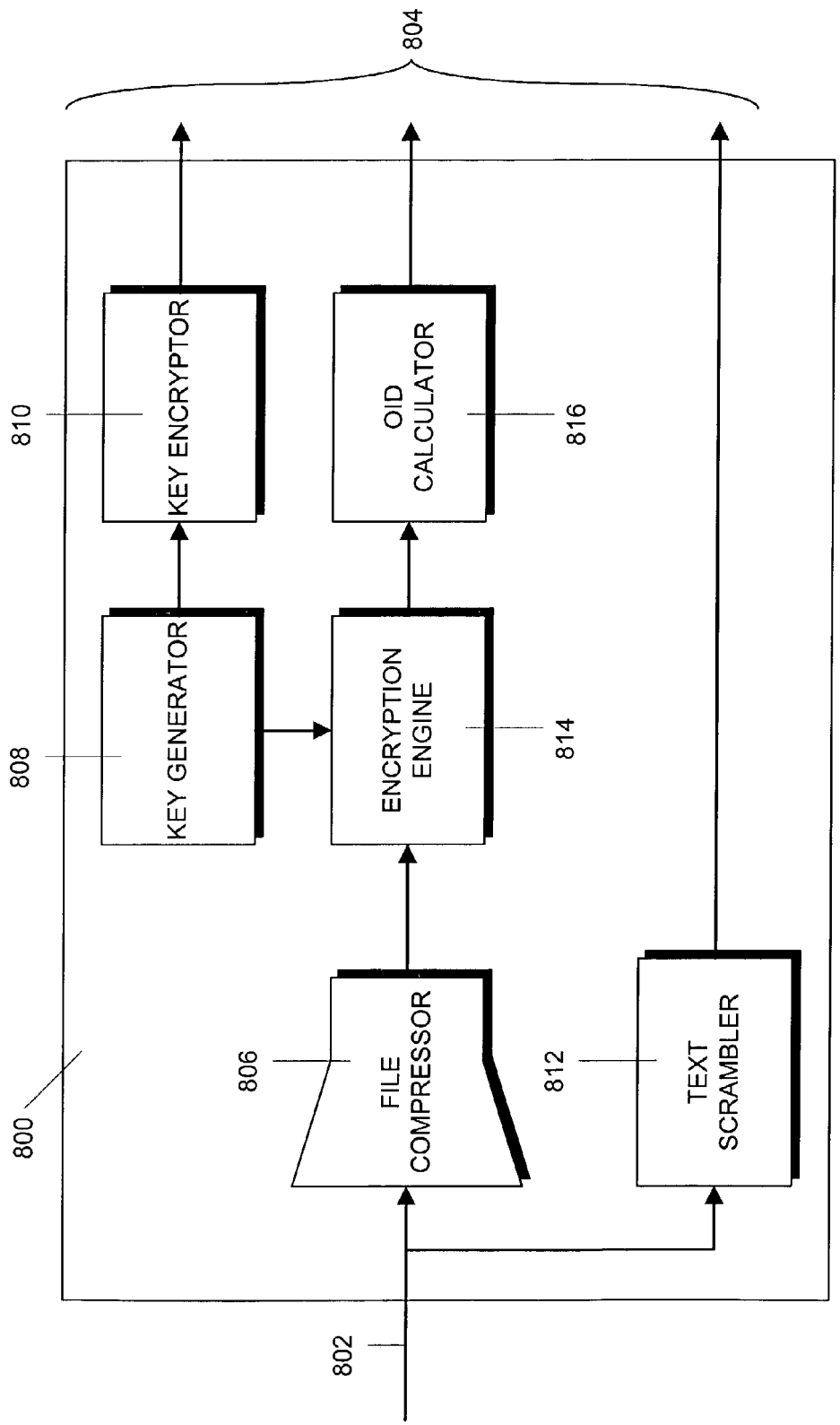
FIG. 8 is a block schematic diagram illustrating the major components of a metrics publishing tool.
Figure 9:
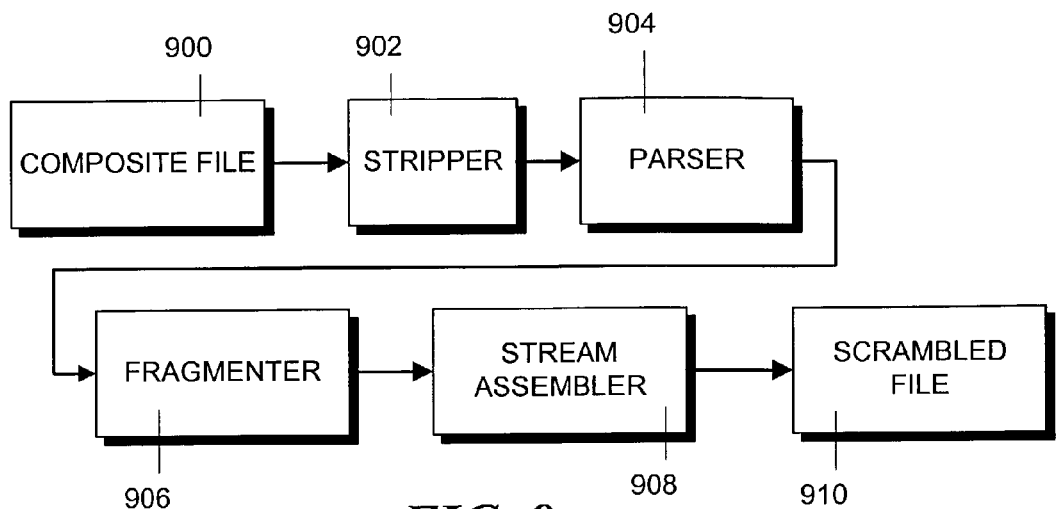
FIG. 9 is a block schematic diagram of apparatus for generating a scrambled text file.

FIGS. 7 and 8 illustrate the operation of a publishing tool 800 in the preparation of a content package that includes a single document for distribution. This process starts in step 700 and proceeds to step 702 where the publishing tool 800 receives a content document 802 as input. A determination is made whether the content document contains text. For content items containing text, in addition to performing the normal processing, the publishing tool 800 contains a text scrambler 812 that performs special processing to create a scrambled, indexable version of the content as set forth in step 706. This processing is described in detail below. The process then continues with the remainder of the normal processing.

Next, in step 704, the publishing tool 800 uses a file compressor 806 to compress the content file using a conventional compression algorithm. For example, "Flate" compression is suitable for use with the invention and is described in detail at the website located at URL http://www.gzip.org/zlib/.

After compressing the file, the publishing tool 800 uses a key generator 808 to generate a unique content key in step 708. For example, in one embodiment, the key generator 808 could operate with the Blowfish algorithm and this key would be a 128-bit Blowfish key. Next, in step 710, the publishing tool 800 uses an encryption engine 814 to encrypt the content item with this unique key. Then, in step 712, the publishing tool 800 uses an OID calculator 816 to calculate a content identifier for the encrypted content item. This content identifier is calculated from the encrypted content by the same algorithm used by the viewer and described in connection with FIGS. 5 and 6. In this case, the same secret string embedded in the viewer code is also embedded in the server code.

Returning to FIG. 7, the OID is stored with the decryption key for the content item. In step 714, the content key is encrypted using the key encryptor 810 with a secret key that is unique to the server. This latter encryption prevents the content key from being discovered by searching the server files. The resulting outputs 804 are then stored in the content database 230 (FIG. 2). The process then finishes in step 716.

As mentioned above, an important feature of the inventive system is the ability to offer text content in a format in which it can be indexed by third-party search utilities and yet not be available as plaintext. The text scrambler 812 uses a process called "content scrambling" to produce an "indexable version" of a composite content file. This process is illustrated in FIGS. 9, 10, 11A and 11B. The process starts in step 1000 and proceeds to step 1002 where the text scrambler receives a composite content file 900 that may contain text and graphics. The text scrambler uses a stripper 902 to remove any formatting information and graphics, producing a stream of plain text. Thus, the text scrambler can handle mixed text and graphic formats such as HTML, Adobe PDF, and Microsoft Office documents.

Next, in step 1004, the text scrambler uses a parser 904 to parse the plain text stream into words. The parsing can be performed in a known manner by using delimiters such as spaces, tabs, etc. to divide the text stream into words. The parser 904 then removes the most common words from the content stream. Such words include common articles, such as "the", "a" and "an", conjunctions, such as "and" and "or", and other common words. In step 1006, a fragmenter 906 breaks the parsed content stream up into random two to five word phrases.

Figure 11A:
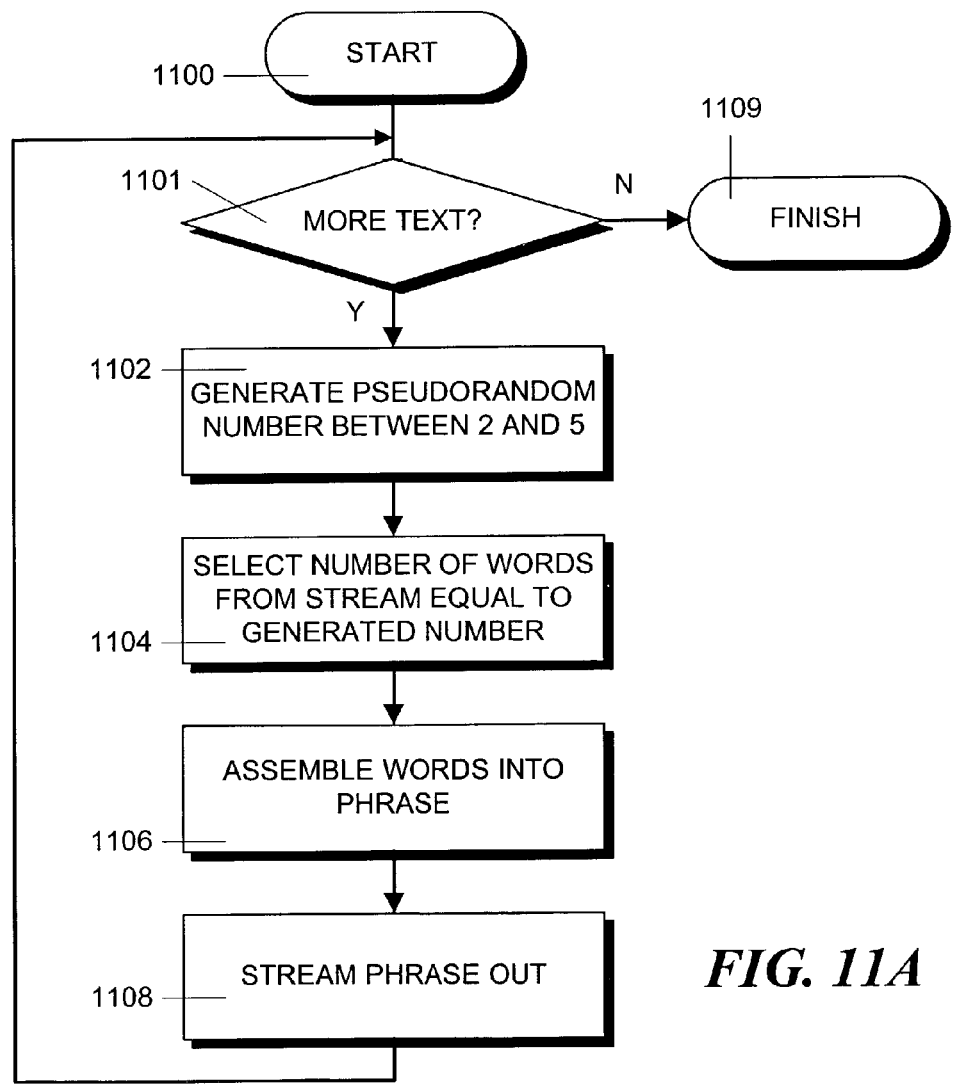
FIGS. 11A and 11B are separate flowcharts that respectively illustrate the operation of the fragmenter and the text assembler of FIG. 9.
Figure 10:
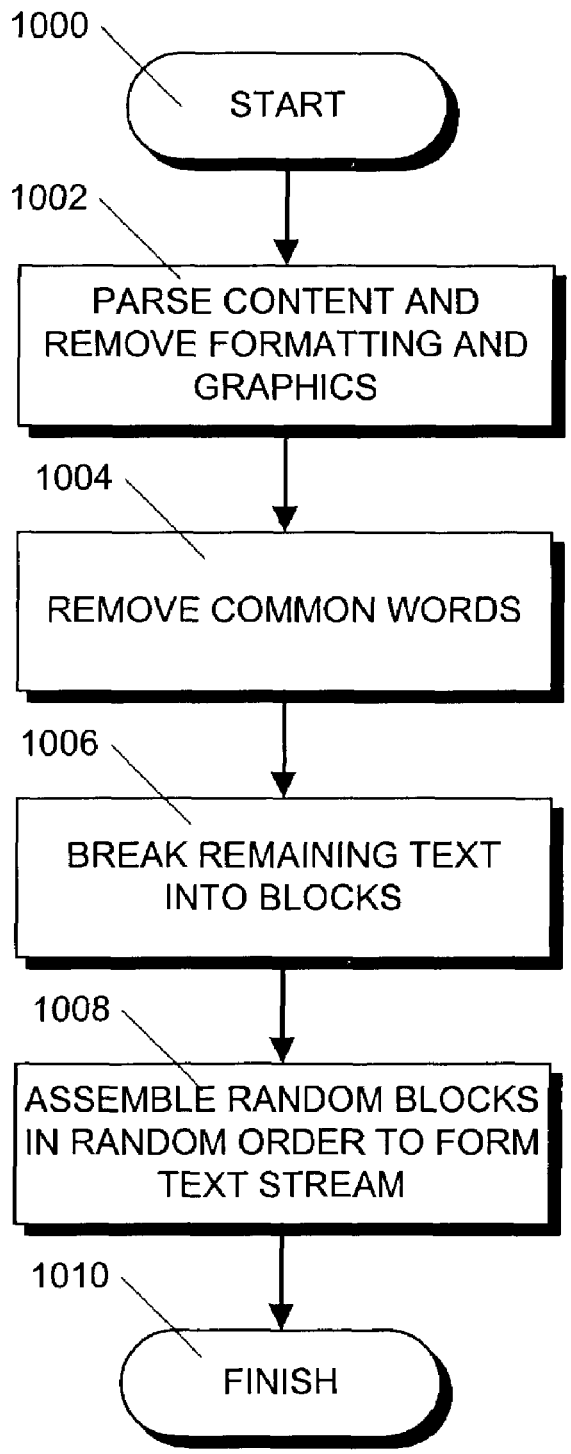
FIG. 10 is a flowchart showing the steps of an illustrative process for generating a scrambled text file using the apparatus of FIG. 9.

The operation of the fragmenter 906 is shown in FIG. 11A. This operation begins in step 1100 and proceeds to step 1101 where a determination is made whether there is more text to be processed. If not, the process ends in step 1109. Assuming there is more text to be processed, then, in step 1102, a pseudo random integer equal to, or greater than, two and less than, or equal to, five is generated in a conventional fashion. In step 1104, a number of words equal to the generated pseudo random number are selected from the stream and the selected words are assembled into a phrase in step 1106. The assembled phrase is streamed out in step 1108. The process then returns to step 1102 where a new phrase is generated starting by generating a new pseudo random number in step 1102. Steps 1104 to 1108 are then performed to generate a new phrase. Operation continues in this fashion until the entire text stream has been processed.

Returning to FIG. 10, in step 1008, the phrases generated by the fragmenter 906 are assembled by stream assembler 908 in random order into an unpunctuated text stream. The manner in which this text stream is assembled is shown in FIG. 11B.

Figure 11B:
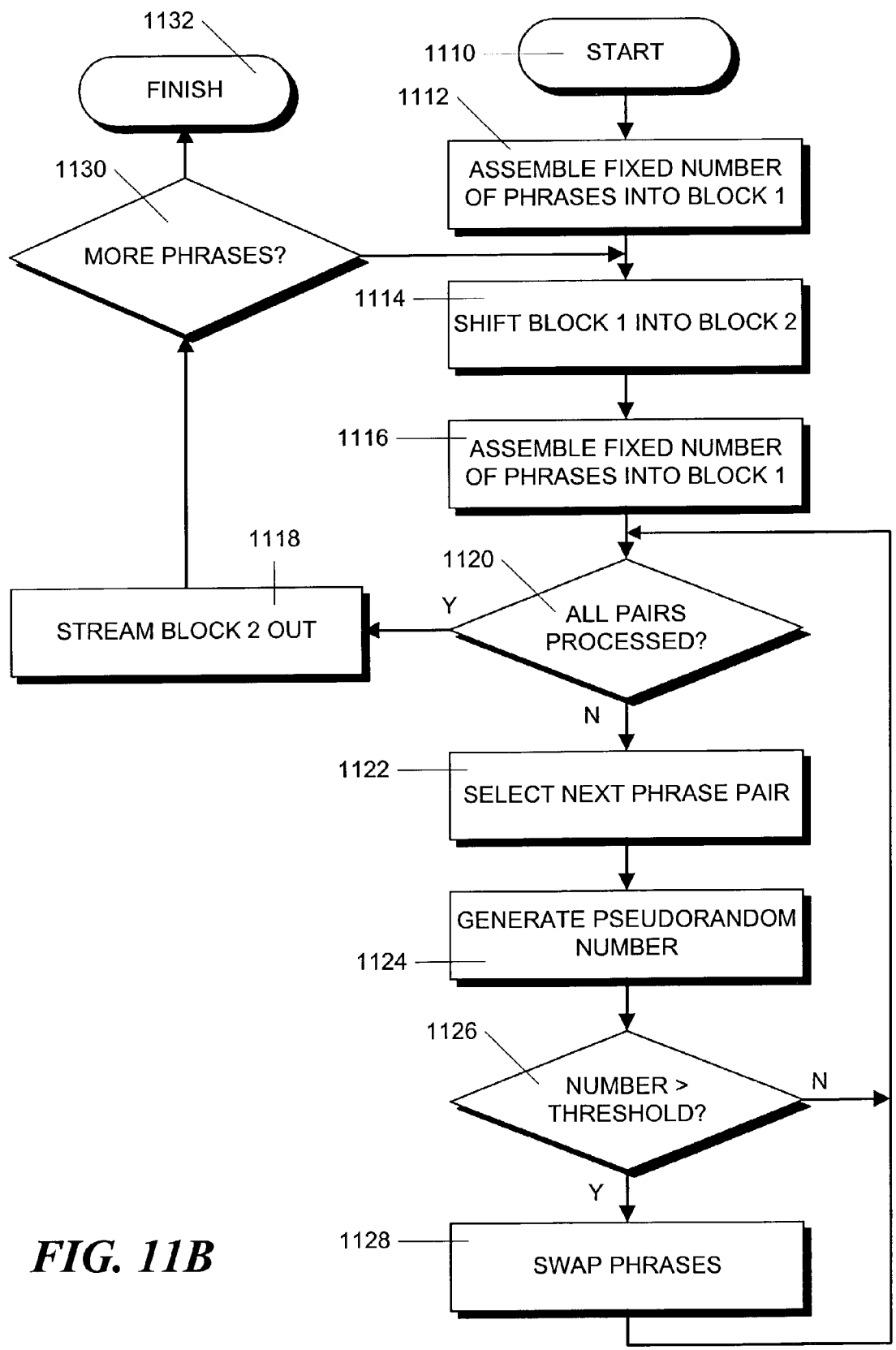

As illustrated in FIG. 11B, the incoming phrases are assembled into "blocks", each of which comprises a fixed, predetermined number of phrases. In particular, the assembly process starts in step 1110 and proceeds to step 1112 where a fixed number of 2-5 word phrases generated by the fragmenter 906 are assembled into a first block.

Proceeding to step 1114, the process then shifts the first block into the second block. In step 1116, the fixed number of phrases is again assembled into the first block. At this point there exist two blocks, both holding the same fixed number of phrases, although the phrases in each block could be of different word lengths. The phrases in the first block are then paired with the phrases in the second block. For example, a phase in the first block can be paired with a phrase in the corresponding location in the second block. Next, a check is made in step 1120 to determine whether all phrase pairs have been processed. If not, the process proceeds to step 1122 where the next unprocessed phrase pair is selected. In step 1124, a pseudo random number is generated for the phrase pair.

In step 1126, the generated pseudo random number is compared to a predetermined threshold. If the generated pseudo random number is greater than the threshold, then, in step 1128, the phrase in the first block is swapped with the phrase in the second block. The process then returns to step 1120 where a decision is made whether all pairs have been processed. Alternatively, if the generated pseudo random number is less than the threshold, then the process returns directly to step 1120.

If, as determined in step 1120, all phrase pairs have been processed, then in step 1118, the second block is streamed out. In step 1130, a decision is made whether additional phrases remain to be processed. If not, the process finishes in step 1132. Alternatively, if additional phrases remain to be processed, then the process returns to step 1114 in which the first block is shifted into the second block and, in step 1116, the first block is filled with the predetermined number of phrases. Operation continues in this fashion until all text phrases have been processed.

The resulting stream contains nearly all of the words in the original content, and most of the phrases, but cannot be read. This unpunctuated text stream is enclosed in a simple HTML file 910 and stored in unencrypted form on the content server where it will be exposed to third-party indexing utilities. These utilities are allowed to crawl the content distribution to build an index of the content. Searching on particular words or phrases will still return most of the same hits as the unscrambled content. However, simply navigating straight to the target file will display to the user a scrambled content file that cannot be read.

When scrambled content is indexed by web-crawling search engines, such as Google™, the inventive distribution system returns the scrambled content. However, when a user uses a browser to link from the search engine to the indexed page, the publisher may prefer to present to the user an e-commerce page containing an unscrambled article extract and an offer to provide the entire, unscrambled article for a purchase price. There are a number of effective techniques to direct the user to the publisher when the user links to the page. For example, browsers and search engines requesting a resource typically supply to the web server a "user agent" parameter that specifies the browser that is requesting the resource. A web server can examine the user agent parameter, and supply the scrambled content to requests containing user agent values that correspond to search engines. Alternatively, the web server can return the publisher's e-commerce page to requests containing user agent values corresponding to browsers.

It is also possible to accomplish the same result by ending the scrambled HTML page with a call to a JavaScript routine that loads the publisher's e-commerce page. In this case, a user at a browser will see the e-commerce page immediately after the scrambled page loads. On the other hand, a search engine will ignore the JavaScript and process only the scrambled page. For cosmetic reasons, the scrambled page in this approach can also be defined to hide the scrambled text from the end user.

Figure 12:
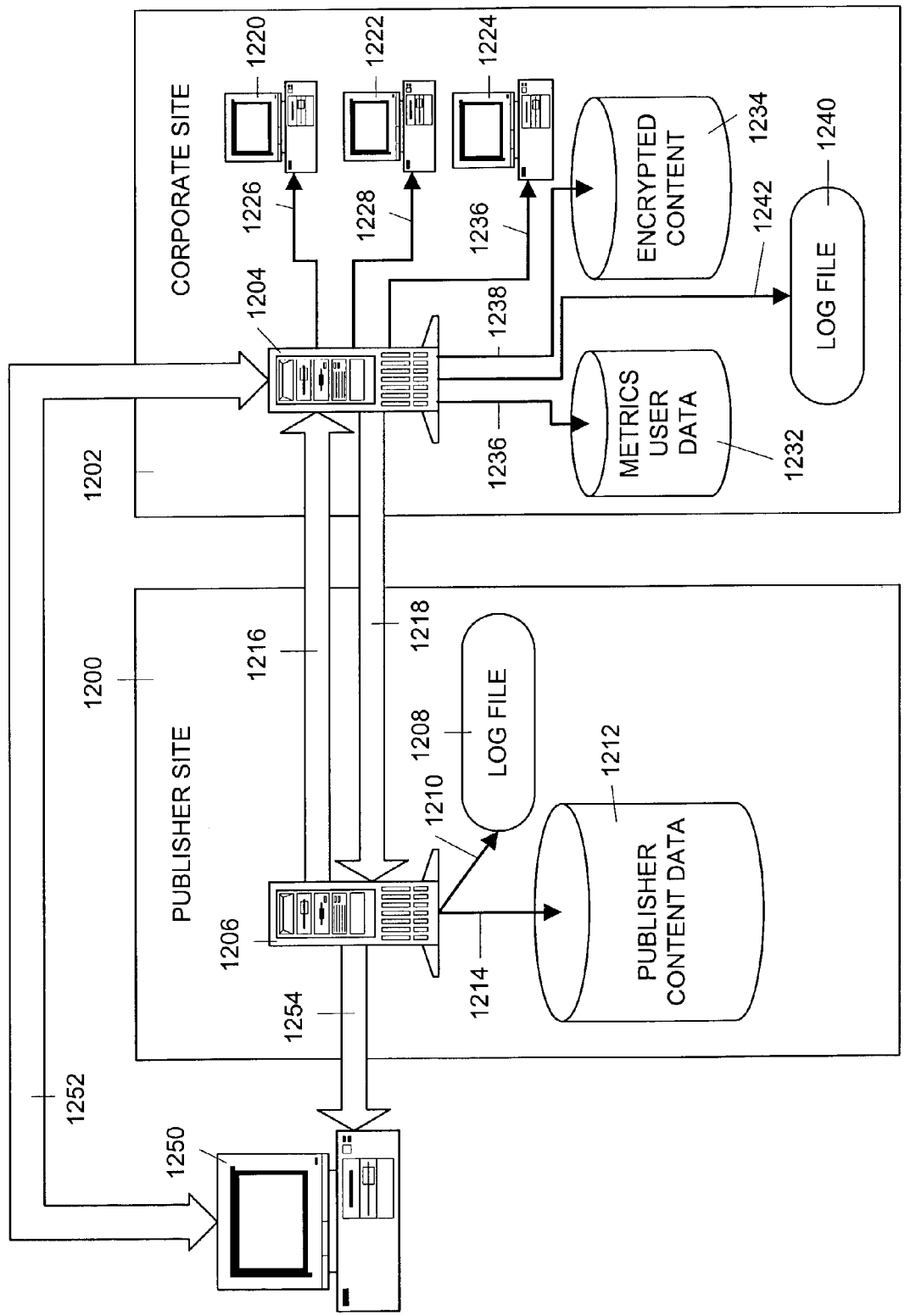
FIG. 12 is a block schematic diagram of an inventive content distribution system operating in distributed mode.

As previously mentioned, the inventive content distribution system can also operate in a distributed mode in which content is provided to users at a customer site from a content server that is also located at the customer site. Such a configuration is shown in FIG. 12. In this configuration, a content server 1204 is located at a corporate site 1202 attached to a corporate intranet or other corporate network. An additional content server 1206 may also be located at the publisher site 1200 to provide controllable and trackable content forwarding as will hereinafter be described. The customer site content server 1204 can also provide content searching capabilities using a conventional search engine such as the Apache Lucene open-source search engine. The content is indexed at load time, using the scrambled text files generated as described below.

The content server 1204 at the customer site manages clients and users at the customer site, performs secure key exchanges with authenticated clients and logs all usage events for later upload to a metrics reporting server. Contrary to the publisher-hosted mode, content is distributed from the publisher's site to the user content server, as indicated schematically by arrow 1216, in blocks of content documents called content distribution archives. Archives might be distributed to customer sites in return for log file information gathered at the customer site as indicated schematically by arrow 1218. The return of log information from the customer site allows the publisher to track content usage at the customer site and to track content forwarding as described below.

As well as containing encrypted documents, the distribution archive is itself encrypted. Consequently, the customer site content server 1204 must unpack the archive and store the encrypted content and keys in the encrypted content database 1234 as schematically indicated by arrow 1238. In order to decrypt the archive during the content loading process, the customer site content server 1204 uses a "scheduled key" to decrypt the archive. The scheduled key for an archive is contained in a previous archive file that was received by the customer. The first time that content is loaded into the customer site server 1204, the scheduled key must be obtained from the publisher, as described below.

In addition to containing the encrypted content files, the archive contains various keys and an OID to decryption key mapping. The OID/Key mapping is also encrypted with the scheduled key. During the unloading process, the encrypted content files are extracted, but not decrypted. The encrypted files are stored in database 1234 and still bear the same names that they did before encryption, but there is no explicit cross-reference between the encrypted files and their decryption keys. In order to find the key that decrypts a given file name, the server receives an OID for the file from a client who is requesting content, then uses the received OID to look up the corresponding key in the OID/Key mapping. The unloading process is described in more detail below.

The customer site server 1204 acts as a conventional server in a client/server application, performing password-based authentication and storing user data in the metrics user database 1232 as indicated schematically by arrow 1236. Data is transferred from the client to the server using the regular HTTP protocol; in cases where the data is secure, encryption is applied to the HTTP payload, rather than using a secure protocol such as SSL. Each client, of which clients 1220-1224 are shown in FIG. 12, can contact the server 1204 as indicated schematically by arrows 1226, 1228 and 1236, respectively, and retrieve content using a process similar to that illustrated in FIGS. 4A and 4B and described in connection with the publisher-based system of FIGS. 2 and 3.

Figure 13A:
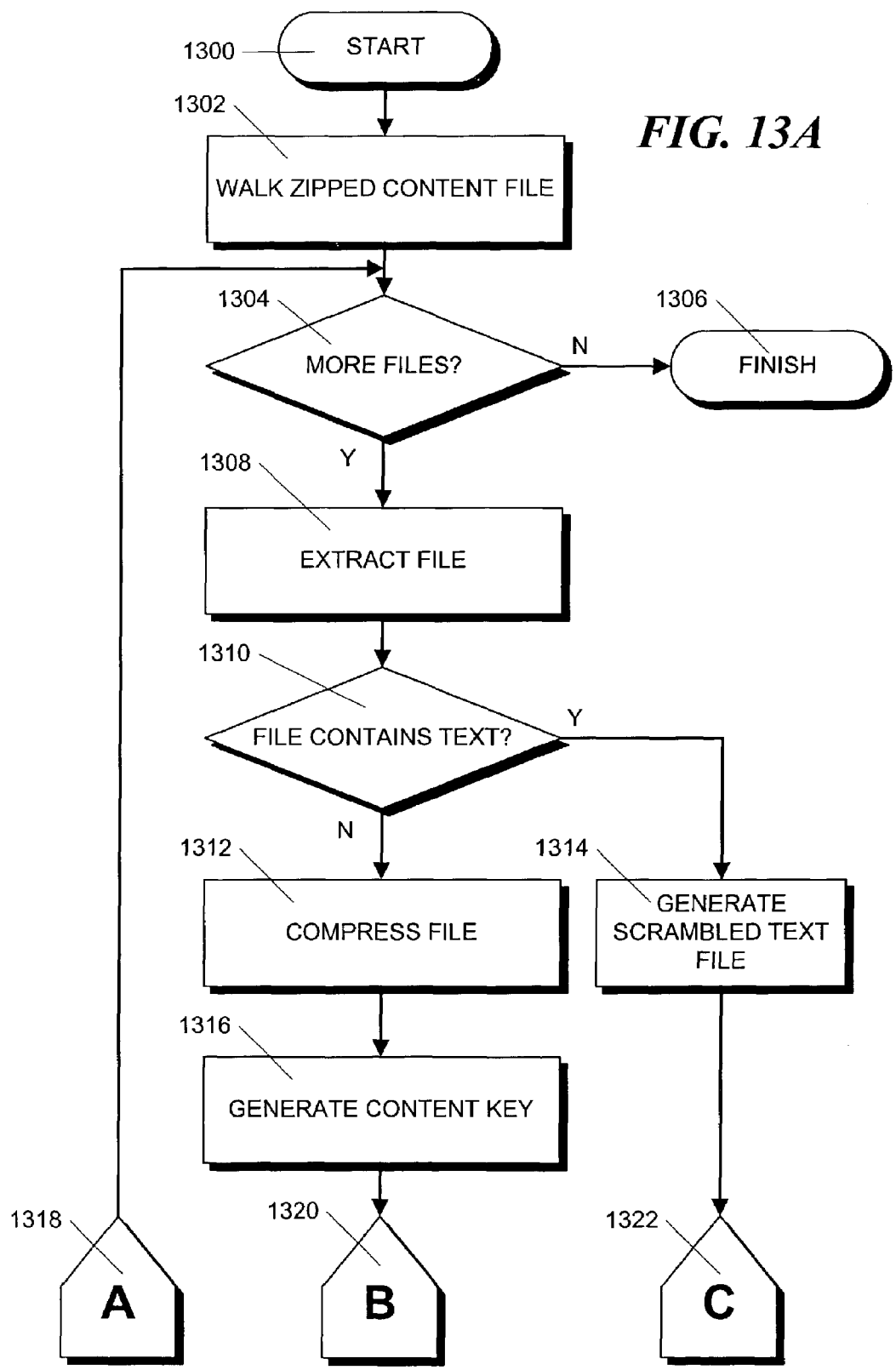
FIGS. 13A and 13B, when placed together, form a flowchart showing the steps of an illustrative process performed by a metrics publishing tool for encrypting documents in the preparation of a distribution archive.
Figure 13B:
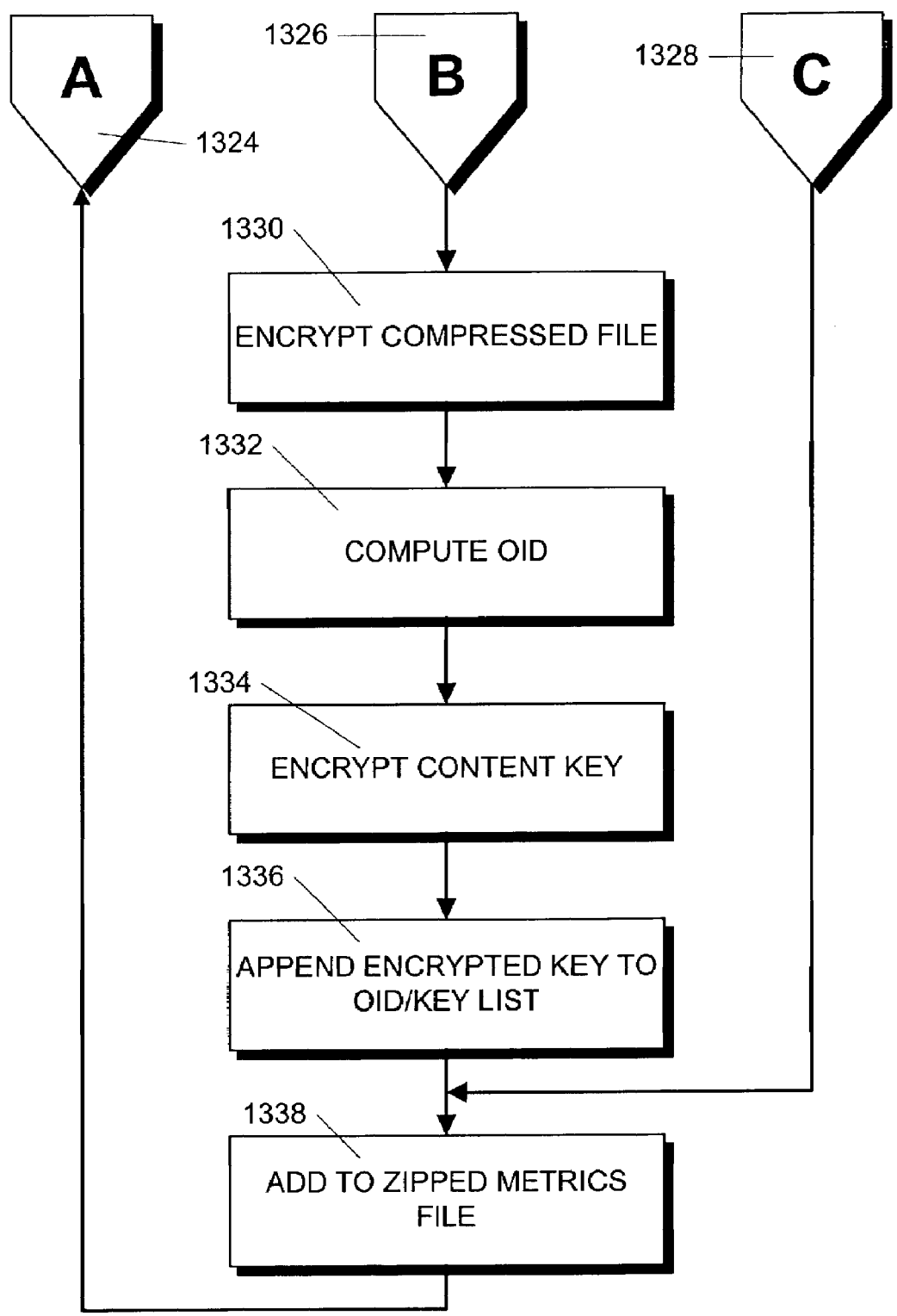
Figure 14A:
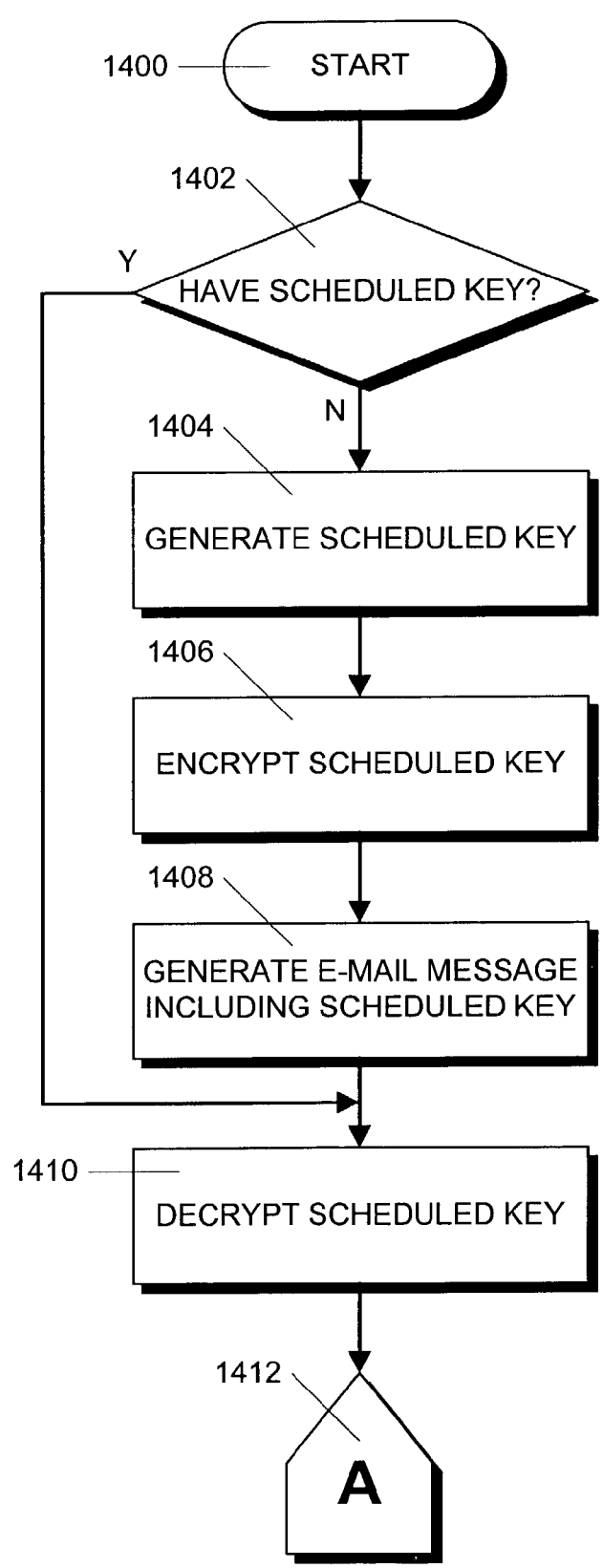
FIGS. 14A and 14B, when placed together, form a flowchart showing the steps of an illustrative process performed by a metrics publishing tool for packaging the encrypted documents and identifying information into a distribution archive.
Figure 14B:
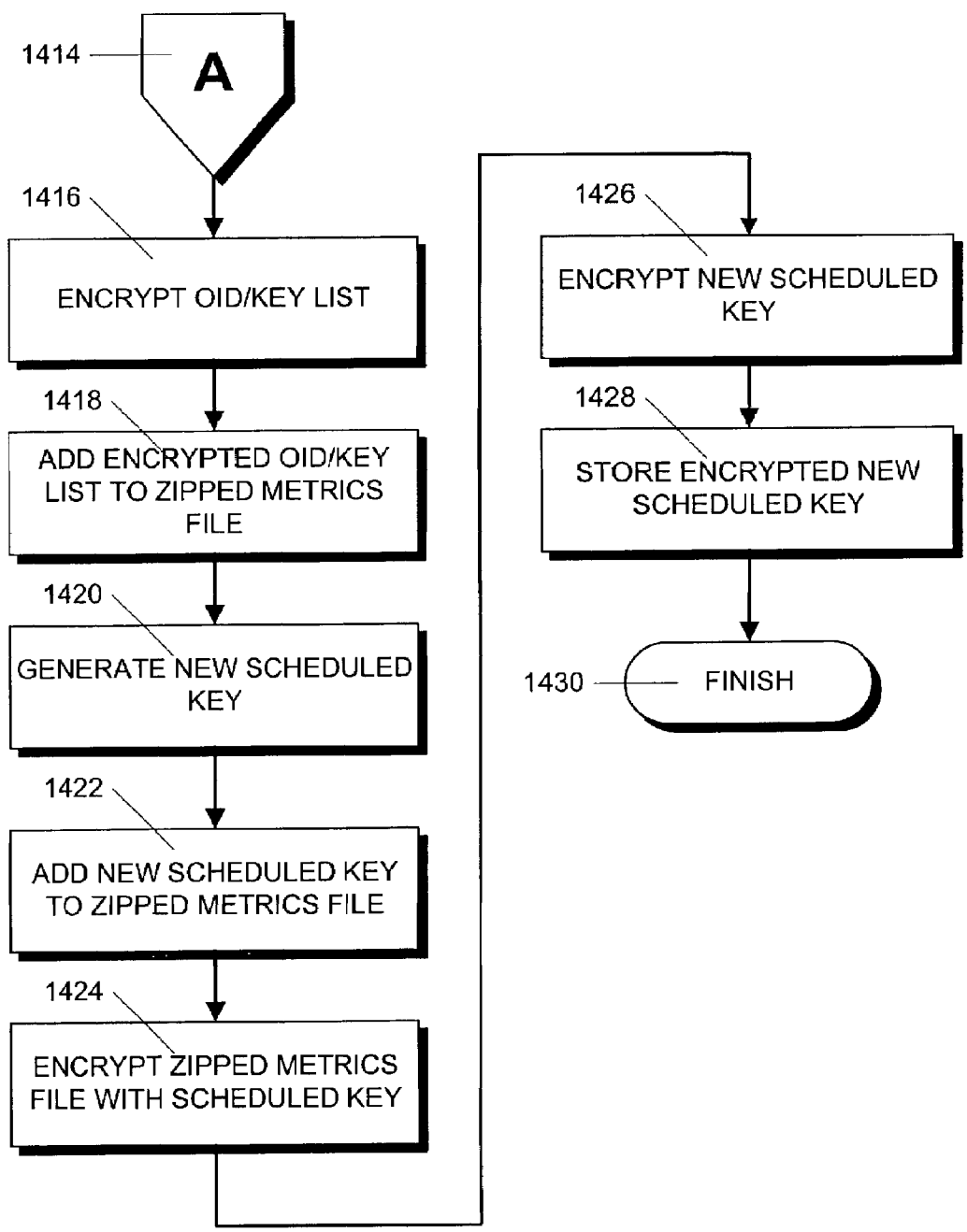

In order to package content documents into a content archive, the publisher uses the publishing tool described above in connection with FIG. 8 that follows the process set forth in FIGS. 13A, 13B and 14A, 14B. The process set forth in FIGS. 13A and 13B illustrates an exemplary process for encrypting the content files. The process set forth in FIGS. 14A and 14B shows an exemplary process for packaging the encrypted content files into a distribution archive.

Generally, the publisher's normal content preparation workflow results in a collection of content files, content files and directories, or compressed content file archives in a location known to the preparation program and specified in a configuration file. Publishers can elect to prepare separate distributions for every customer, with, if desired, different content subsets for each. In this case, a separate configuration file is maintained for each customer. The content preparation process starts in step 1300 and proceeds to step 1302 where the publishing tool examines each file in the content directories, or in the compressed content file archive in a location specified in the customer configuration file. In step 1304, a determination is made whether any files remain to be processed. If all files have been processed, then the process ends in step 1306.

Alternatively, if files remain to be processed, for each content item in the content collection, the publishing tool extracts the file as set forth in step 1308. Then the file is examined and, in step 1310, a determination is made whether the file contains text. For content items containing text, in addition to performing the normal processing, the publishing tool contains a text scrambler 812 that performs special processing to create an indexable version of the content as set forth in step 1314. This processing is described in detail above in connection with FIGS. 9, 10, 11A and 11B. After generating the scrambled file, the process proceeds, via off-page connectors 1322 and 1328, to step 1338 where the scrambled file is added to the distribution archive package as described below.

Next, in step 1312, the content file is compressed in the file compressor 806 using, for example, the aforementioned Flate compression algorithm. Then, in step 1316, a key generator 808 in the publishing tool 800 generates a unique 128-bit content encryption key, using, for example, the aforementioned Blowfish algorithm. The process proceeds, via off-page connectors 1320 and 1326 to step 1330 where the publishing tool 800 encrypts the compressed content item with the unique content key generated in step 1316 using the encryption engine 814.

The publishing tool 800 then calculates a content identifier for the content item as set forth in step 1332 with the OID calculator 816. This process is described above in connection with FIGS. 7 and 8. The resulting value is mathematically likely to be unique to the particular encrypted file, and cannot be derived from the data in the file alone. The OID is used as the content identifier, and is stored with an encrypted content key for the content item.

Then, in step 1334, the content key is encrypted with the key encryptor 810 using the aforementioned Blowfish algorithm. Then, in step 1336, the computed OID and the encrypted content key are appended to a cache corresponding to the archive file. Specifically, the publishing tool caches a list of keys and OIDs as it encrypts every content file. This cache is called an OID/Key mapping.

After each content item is encrypted in step 1330, the resulting encrypted data is stored in a compressed file, the distribution archive, under the same name and in the same relative position under the archive root as the position of the original file in the original content file. This is accomplished in step 1338. The process then returns, via off-page connectors 1324 and 1318 back to step 1304 to determine if additional files need to be processed. Operation continues in this manner until all files have been processed. The result is an archive file containing encrypted content files and an OID/Key mapping for each file. These two files are then packaged into the final distribution archive by the process shown in FIGS. 14A and 14B.

There are two slightly different processing flows for content packaging, depending on whether a particular subscription or distribution (to a particular customer or group of customers) is the first distribution to that customer or is a subsequent distribution to that customer. In particular, during the packaging process, the OID/Key mapping is encrypted with the aforementioned scheduled key. A new scheduled key is included with each distribution archive. This new key will be used to decrypt the next distribution archive received by the customer. Therefore, the first time a particular customer receives a distribution archive, the customer will not have the scheduled key and it will be necessary to send the required key to the customer. After the first distribution archive has been received, the customer will have the scheduled key that was delivered in the previous distribution archive.

The packaging process begins in step 1400 and proceeds to step 1402 where a decision is made whether the customer to which the archive is being sent already has the scheduled key. If this is not the first distribution, then the process proceeds to step 1410, which is discussed below. If the intended customer does not have the scheduled key, the process proceeds to step 1404 where the publishing tool 800 generates a new scheduled key using the key generator 808. For example, this key may be a 128-bit Blowfish key. In step 1406, this new scheduled key is encrypted using the key encryptor 810 and, for example, the Blowfish algorithm and a secret key internal to the server. This encrypted key is not added to the archive, but it is stored in a separate file. The encryption prevents the scheduled key from being discovered by searching the server files. The unencrypted key is also sent to the customer via a channel that is separate from the channel used to send the distribution archives For example, the scheduled key may be e-mailed to the customer as set forth in step 1408.

When the distribution archive is to be packaged, in step 1410 the scheduled key is retrieved from storage and decrypted using the secret server key. The process then proceeds, via off-page connectors 1412 and 1414, to step 1416 where the publishing tool 800 encrypts the OID/Key mapping using the encryption engine 814 with the scheduled key before adding the mapping to the distribution archive in step 1418.

The publishing tool in step 1420 generates yet another key using the key generator 808 (for example, a 128-bit Blowfish key), called the new scheduled key. This new scheduled key is stored in the distribution archive in step 1422 and will be used by the customer to decrypt the next distribution archive that is received. Next, in step 1424, the scheduled key is used to encrypt the entire distribution archive using the encryption engine 814. The new scheduled key is also encrypted with a secret server 30 key in step 1426 and stored in a configuration file for the customer in step 1428. The process then ends in step 1430. At this point, the distribution archive is complete and ready for publication to its customer or customers.

The use of the scheduled keys and next scheduled keys builds a chain of distribution files. However, if a customer misses a distribution or loses a distribution archive file, it will be impossible for the customer to load any subsequent distribution archive files. If this occurs, the customer must contact the publisher and request a new distribution. The publisher then creates a "first-time" distribution archive, with its explicit scheduled key, and transfers the archive and the scheduled key to the customer via separate channels (for example, the archive can be sent via FTP and the key can be sent via e-mail).

Figure 15:
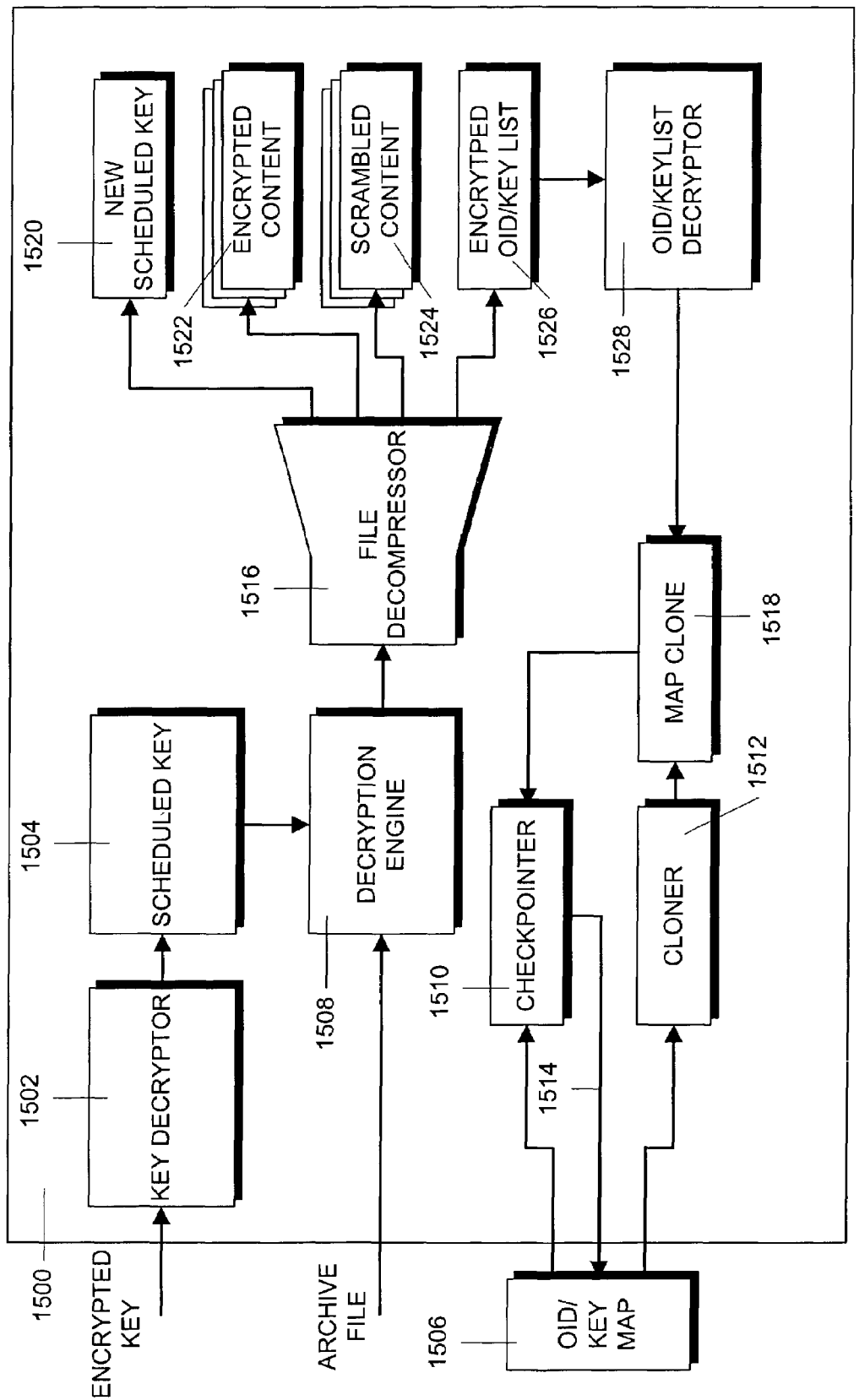
FIG. 15 is a block schematic diagram illustrating the major components of an update manager in a customer site server.
Figure 16A:
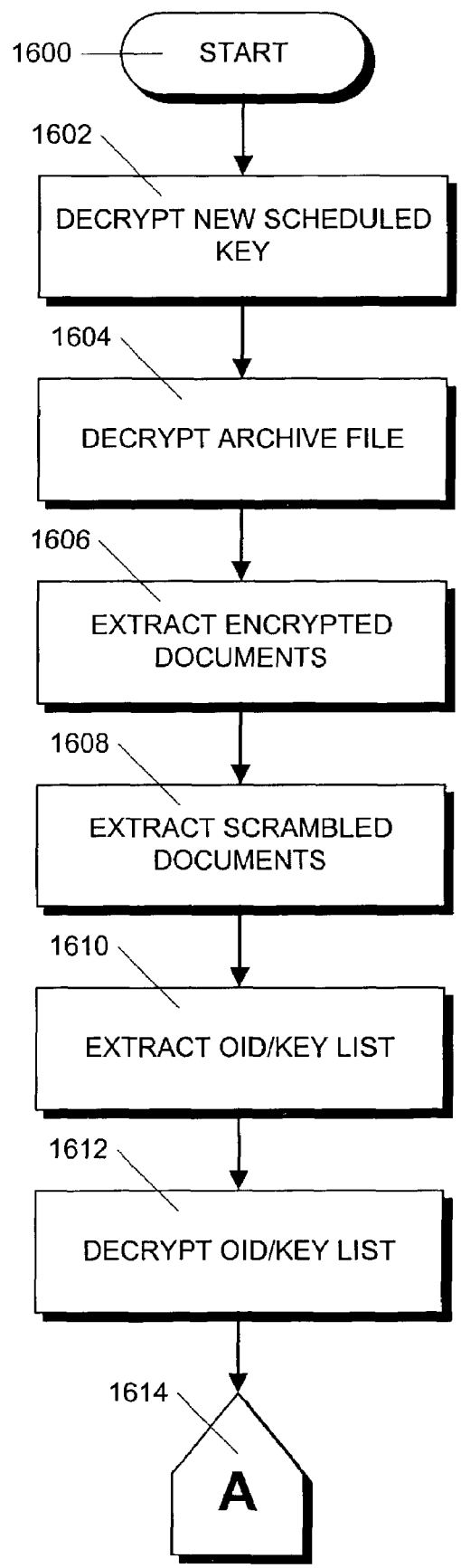
FIGS. 16A and 16B, when placed together, form a flowchart showing the steps of an illustrative process performed by the update manager in lading and unpacking a distribution archive received by a customer site server.
Figure 16B:
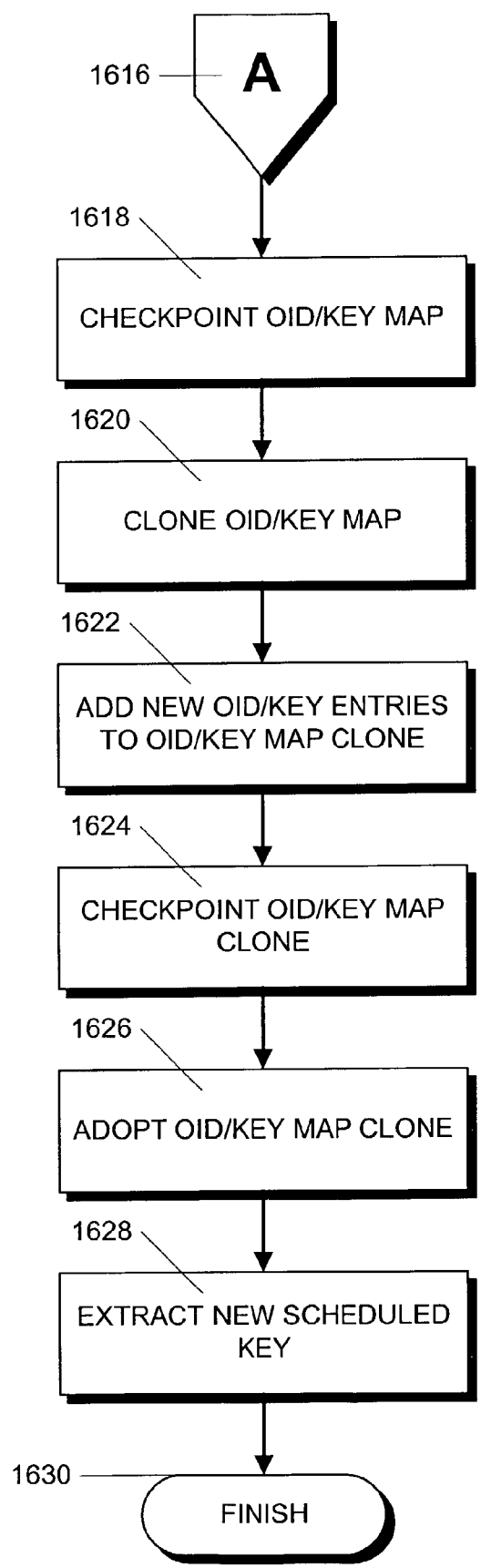

Returning to FIG. 12, when the customer site server 1204 receives a distribution archive it must "unpack" the archive before users can access the content therein. The unpacking process is performed by an update manager and is illustrated in FIGS. 15, 16A and 16B. FIG. 15 illustrates the internal architecture of the update manager 1500 in more detail. The process begins in step 1600 and proceeds to step 1602 where the update manager 1500 uses a key decryptor 1502 to decrypt the scheduled key received with the distribution archive file that was previously received. Then, in step 1604, the decrypted new scheduled key is used in the decryption engine 1508 to decrypt the distribution archive file. The resulting decrypted file contains the encrypted content files, the scrambled content files, an encrypted OID/Key list and an encrypted new scheduled key.

In step 1606, the manager 1500 uses a file decompressor 1516 to extract the encrypted content files 1522. These files 1522 are then stored in the content database 1234 located at the customer site. Next, as set forth in step 1608, the file decompressor 1516 is used to extract the scrambled content files 1524. These files 1524 are then stored in the customer site server in a location at the customer site that will be accessible to third party search engines.

In step 1610, the file decompressor 1516 is used to extract the encrypted OID/Key list 1526 from the distribution archive file. An OID/Key list decryptor 1528 decrypts the OID/Key list using the new scheduled key obtained in step 1602. The process then proceeds, via off-page connectors 1614 and 1616, to step 1618 where the OID/Key map 1506 already existing in the customer site server is checkpointed using checkpointer 1510. The checkpointer 1510 establishes a base state of the map before changes are made so that the map can be returned to its original state if errors occur during the addition of the new OID/Key values received in the archive file.

The existing OID/Key map is then cloned by cloner 1512 in step 1620 to produce a map clone 1518. The new OID/Key entries produced by the OID/Key list decryptor 1528 are then added to the map clone 1518 in step 1622. In step 1624, the checkpointer 1510 is used to checkpoint the map clone 1518. If the checkpointing succeeds, then, in step 1626, the map clone with the added entries 1518 is adopted by overwriting the existing OID/Key map 1506 in step 1626 and as schematically illustrated by arrow 1514. Finally, in step 1628, the file decompressor 1516 is used to extract the new scheduled key 1520 from the distribution archive file for use in decrypting the next distribution archive file. The process then ends in step 1630.

Figure 17:
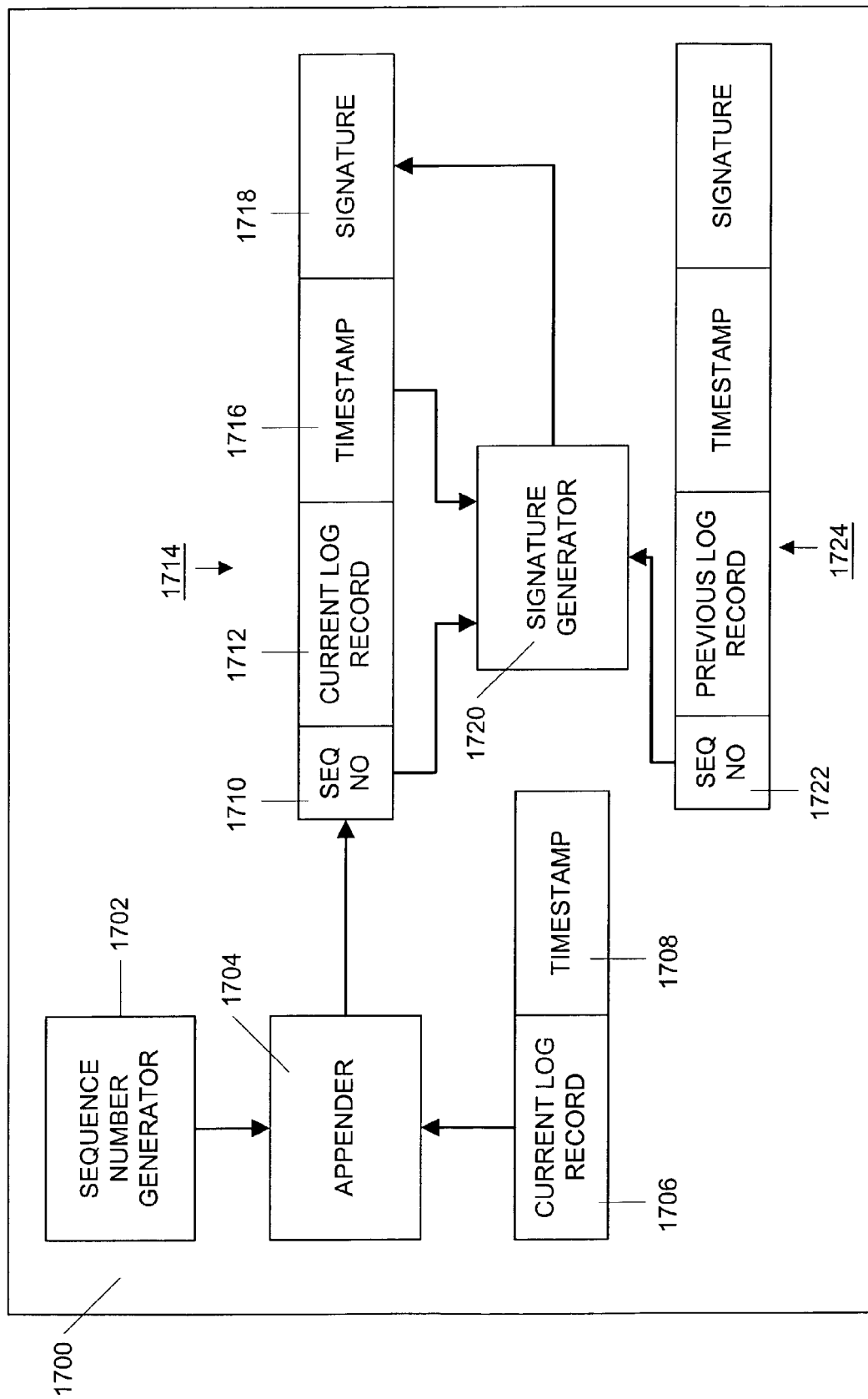
FIG. 17 is a block schematic diagram of the major components of a logging apparatus, illustrating the signing of log entries.
Figure 18:
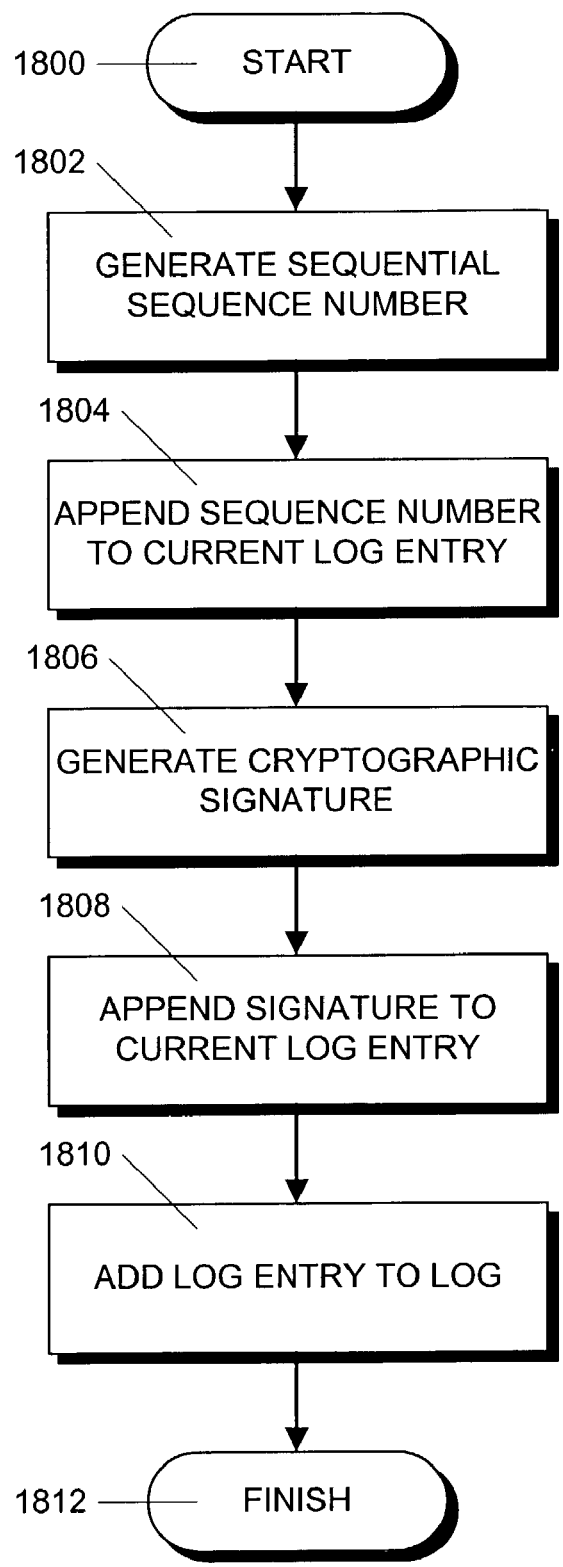
FIG. 18 is a flowchart showing the steps of an illustrative process for signing a log entry using the apparatus of FIG. 17.

Returning to FIG. 12, the client site server 1204 logs all client activity that occurs at the customer site in a plaintext log file 1240 as indicated schematically by arrow 1242. Such activity could include accessing and opening a document, selecting a document, searching or printing a document. The log file 1240 is kept in plaintext so that privacy-conscious customers are able to verify that the log file does not report confidential data. In order to reduce the possibility of file corruption or deliberate modification, the logging apparatus in the server signs each log file entry according to the process illustrated in FIGS. 17 and 18. The process starts in step 1800 and proceeds to step 1802 where the logging apparatus 1700 generates a sequential sequence number by means of the sequence number generator 1702. Then, in step 1804, the generated sequence number is appended to the current log record 1706, (which includes timestamp 1708) by the appender 1704.

Next, in step 1806, the logging apparatus 1700 uses a signature generator 1720 to generate a digital signature 1718 based on the sequence number 1710 appended to the current log record 1712, the timestamp 1716 of the current log record and the sequence number 1722 appended to the previous log record 1724. This signature 1718 is then appended to the current log record 1712 in step 1808. Finally, the entire log entry 1714 is entered into the log in step 1810. The process then finishes in step 1812.

Figure 19:
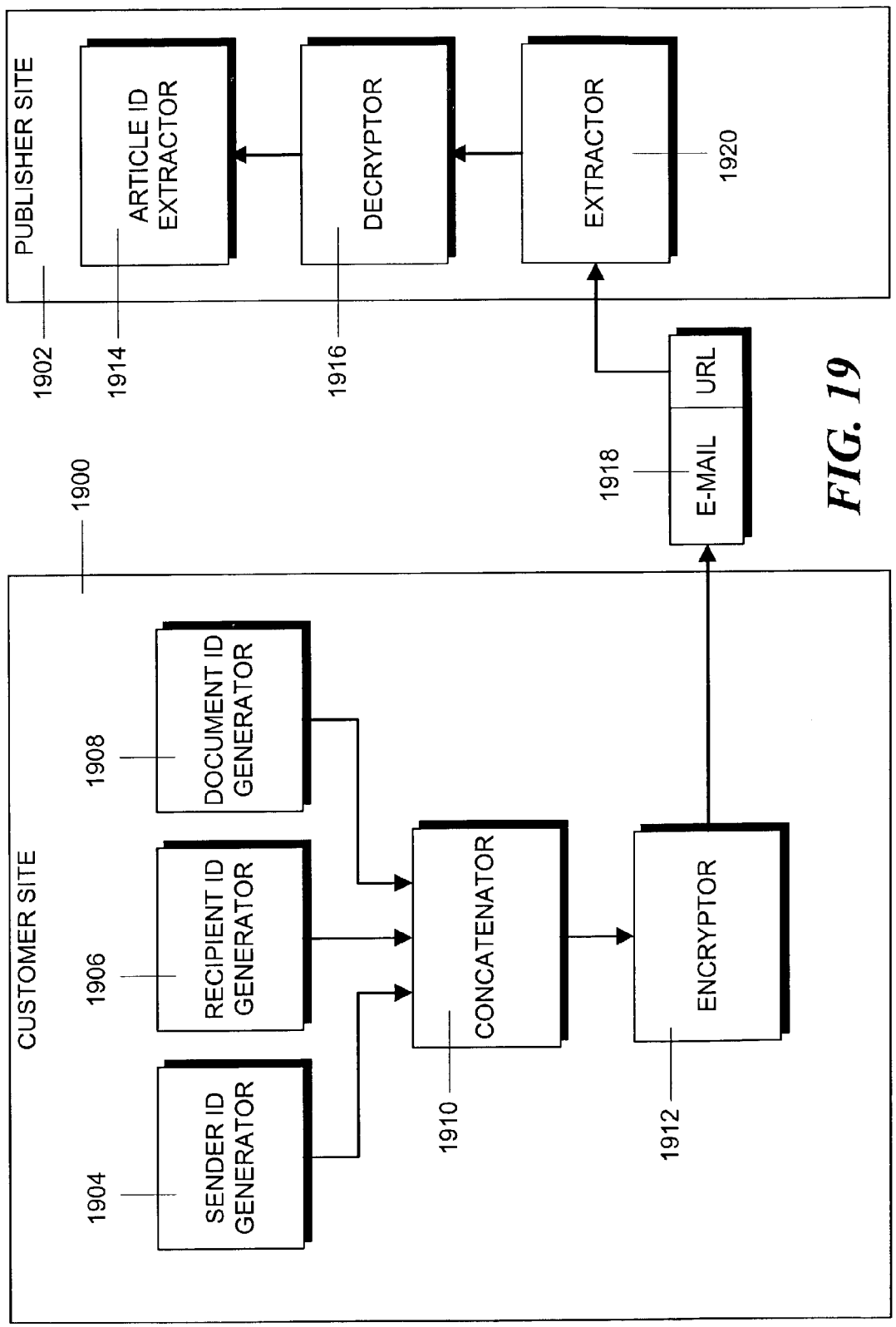
FIG. 19 is a block schematic diagram illustrating the major components involved in creating a forwarding e-mail message and processing a URL received in a forwarding server.
Figure 20:
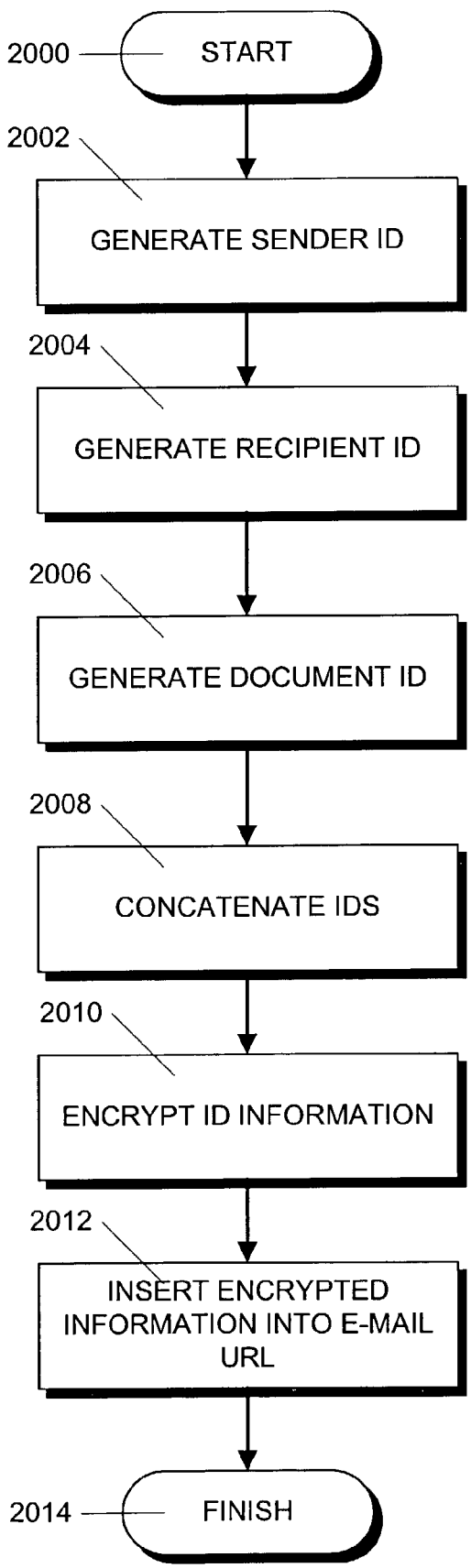
FIG. 20 is a flowchart showing the steps of an illustrative process for creating a forwarding e-mail using the apparatus of FIG. 19.
Figure 21:
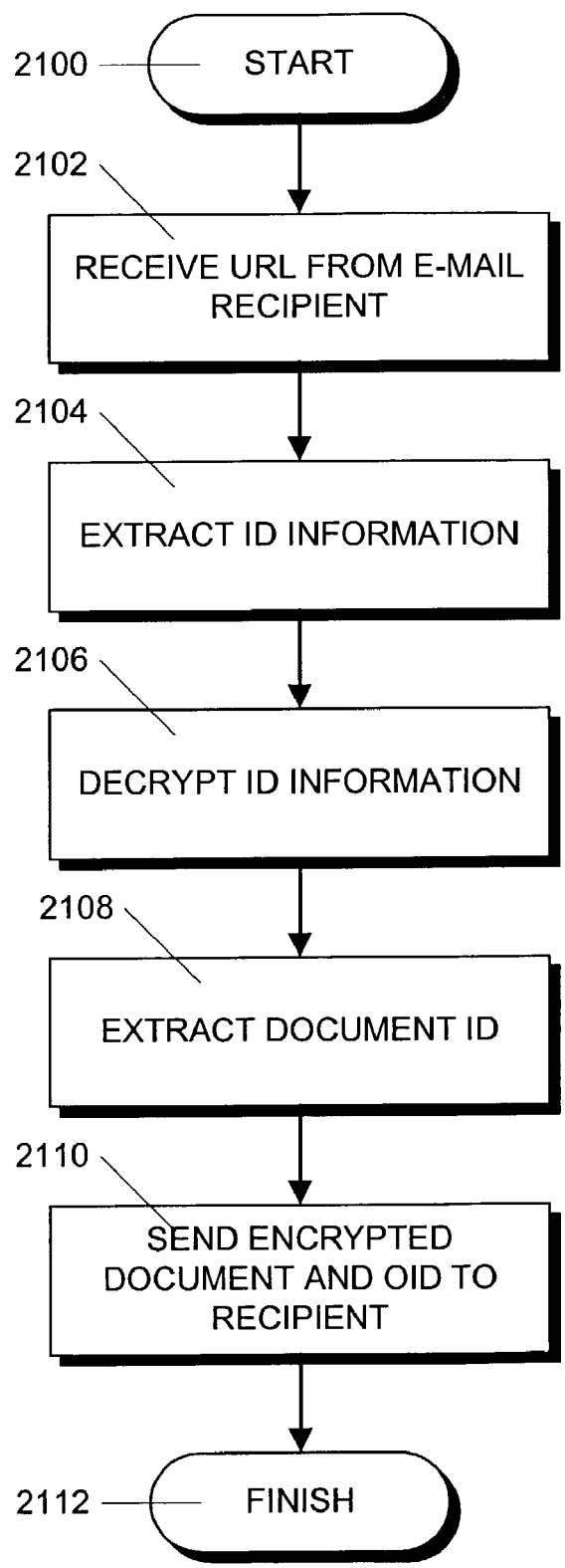
FIG. 21 is a flowchart showing the steps of an illustrative process for processing a URL received in a forwarding server using the apparatus of FIG. 19.
Figure 22:
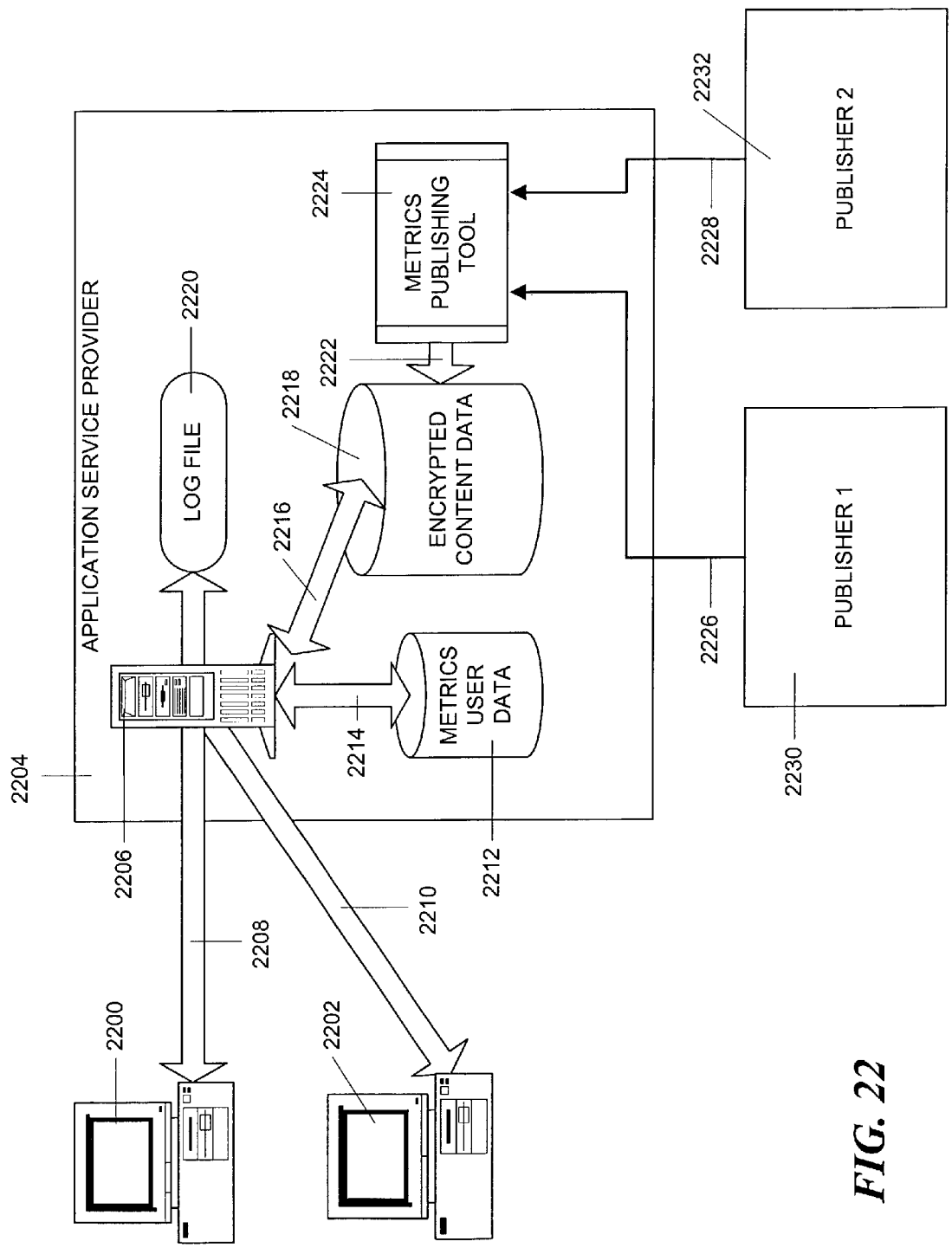
FIG. 22 is a block schematic diagram of an embodiment of the invention in which a metrics server located at an application service provider site receives content from several publishers and requests for content from the publisher's server and delivers encrypted content to a viewer located in a user browser.

In accordance with another aspect of the invention, in the distributed mode, a client can "forward" a content document to one or more recipient e-mail addresses, including addressees who are not part of the client's corporate network. This forwarding process allows the recipients to access the specified content without losing the content protection. It also allows the inventive distribution system to track usage activity of recipient users in the same fashion as previously-registered users. This process is illustrated in FIGS. 19, 20 and 21. An overall view of the process is illustrated in FIG. 19. The steps in preparing the e-mail are shown in FIG. 20 and the steps in receiving and processing the content document identification information from the e-mail recipient are shown in FIG. 21.

The process begins in step 2000 and proceeds to step 2002 where a user logged into a customer site server (for example server 1204, FIG. 12) at a customer site 1900 uses the metrics viewer operating in his browser to send an e-mail to another user in order to "forward" a selected content document. The metrics viewer communicates to the customer site server 1204 to prepare an email with a link to the original publisher site 1902. In step 2002, the customer site server 1204 uses a sender ID generator 1904 to generate a sender ID. Generally, the sender ID would be a text string identifying the sender and the sender's corporate network. Next, in step 2004, the server 1204 uses a recipient ID generator 1906 to generate a recipient ID. Generally, the recipient ID would be a text string identifying the recipient and the recipient's corporate network.

Then, in step 2006, the server 1204 uses a document ID generator 1908 to generate an ID identifying the content document that will be forwarded. This content ID might be the document name or URL. In step 2008, a concatentator 1910 concatenates the three IDs and, in step 2010, the ID information is encrypted with an encryptor 1912. In one embodiment, this latter encryption might be RSA public key encryption using the public key of the publisher site that originated the content document. The encrypted ID string is then inserted into a URL that appears as a link when the e-mail arrives in the recipient's e-mail program or browser as set forth in step 2012. The process then finishes in step 2014. Subsequently, the e-mail 1918 is sent to the recipient.

When the recipient clicks on the link to the publisher in the e-mail, a supported browser is opened and the browser navigates to a "forwarding" metrics server in the publisher's site. This server might be server 1206 in publisher site 1200 as shown in FIG. 12. During this process, the URL in the e-mail is sent to the server and processed as set forth in FIG. 21. The server then downloads the metrics viewer described previously into the recipient's browser and launches the viewer as hosted by the server. The recipient then logs into the server 1206 and registers in the fashion described above.

Processing of the URL received at the forwarding server 1206 starts in step 2100 and proceeds to step 2102 where the URL is received from the e-mail recipient. In step 2104, the forwarding server at the publisher site 1902 uses an extractor 1920 to extract the ID information from the URL. Next, in step 2106, a decryptor in the forwarding server decrypts the ID information using the private key of the public/private key pair in the publisher site. Then, in step 2108, a document ID extractor extracts the document Id from the decrypted ID information. The forwarding server uses the document ID to locate the encrypted document information in the encrypted content database 1234. The encrypted content information and accompanying OID are then sent to the e-mail recipient's metrics viewer as set forth in step 2110. The process then finishes in step 2112. Operation then proceeds as set forth in FIGS. 4A and 4B.

The forwarding server 1206 can also log the sender's and recipient's ID information in a local log file 1208 as indicated schematically by arrow 1210. In this manner the forwarding of content can be tracked. The information in log file 1208 and the information in log file 1240 can then be provided to a metrics reporting server (not shown in FIG. 12) that catalogs and formats the information to prepare reports. encryption using the public key of the publisher site that originated the content document. The encrypted ID string is then inserted into a URL that appears as a link when the e-mail arrives in the recipient's e-mail program or browser as set forth in step 2012. The process then finishes in step 2014. Subsequently, the e-mail 1918 is sent to the recipient.

When the recipient clicks on the link to the publisher in the e-mail, a supported browser is opened and the browser navigates to a "forwarding" metrics server in the publisher's site. This server might be server 1206 in publisher site 1200 as shown in FIG. 12. During this process, the URL in the e-mail is sent to the server and processed as set forth in FIG. 21. The server then downloads the metrics viewer described previously into the recipient's browser and launches the viewer as hosted by the server. The recipient then logs into the server 1206 and registers in the fashion described above.

Processing of the URL received at the forwarding server 1206 starts in step 2100 and proceeds to step 2102 where the URL is received from the e-mail recipient. In step 2104, the forwarding server at the publisher site 1902 uses an extractor 1920 to extract the ID information from the URL. Next, in step 2106, a decryptor in the forwarding server decrypts the ID information using the private key of the public/private key pair in the publisher site. Then, in step 2108, a document ID extractor extracts the document ID from the decrypted ID information. The forwarding server uses the document ID to locate the encrypted document information in the encrypted content database 1234. The encrypted content information and accompanying OID are then sent to the e-mail recipient's metrics viewer as set forth in step 2110. The process then finishes in step 2112. Operation then proceeds as set forth in FIGS. 4A and 4B.

Figure 23:
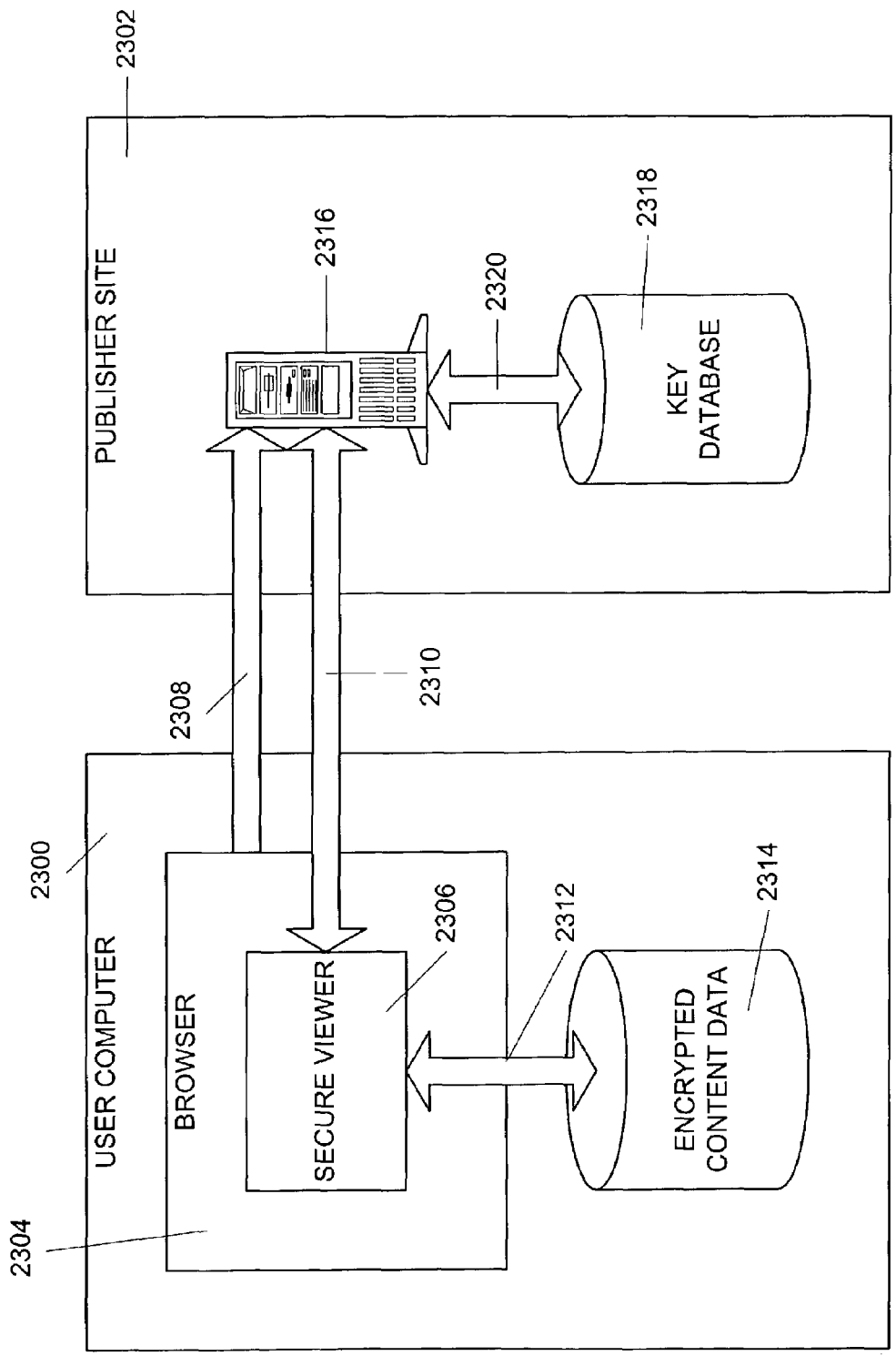
FIG. 23 is a block schematic diagram of still another embodiment in which encrypted content data is stored locally on a user's computer and is decrypted and displayed in a secure viewer using decryption keys that are downloaded from a networked server.

The forwarding server 1206 can also log the sender's and recipient's ID information in a local log file 1208 as indicated schematically by arrow 1210. In this manner the forwarding of content can be tracked. The information in log file 1208 and Still another embodiment is illustrated in FIG. 23. In this embodiment, a user can elect to store encrypted content in a database 2314 located on his or her computer 2304. For example, the content may be delivered from a publisher site 2302 by conventional means, such as CDs or DVDs. In order to view the content, the user must log in to a metrics key server 2316 located at the publisher's site 2302 or another central location using a conventional browser 2304, as indicated schematically by arrow 2308. During the login procedure, the secure content viewer software 2306 is downloaded over the network into the user's browser 2306 as indicated schematically by arrow 2310. In response to information from the user identifying a document, the content viewer 2306 reads the encrypted content from the local database 2314, and computes a document identifier from the encrypted content in a manner previously discussed. The viewer 2306 then sends the document identifier to the key server 2316 in order to retrieve decryption keys from the key database 2318. The decryption keys are then used to decrypt the encrypted content in the secure viewer software 2306.

Figure 24:
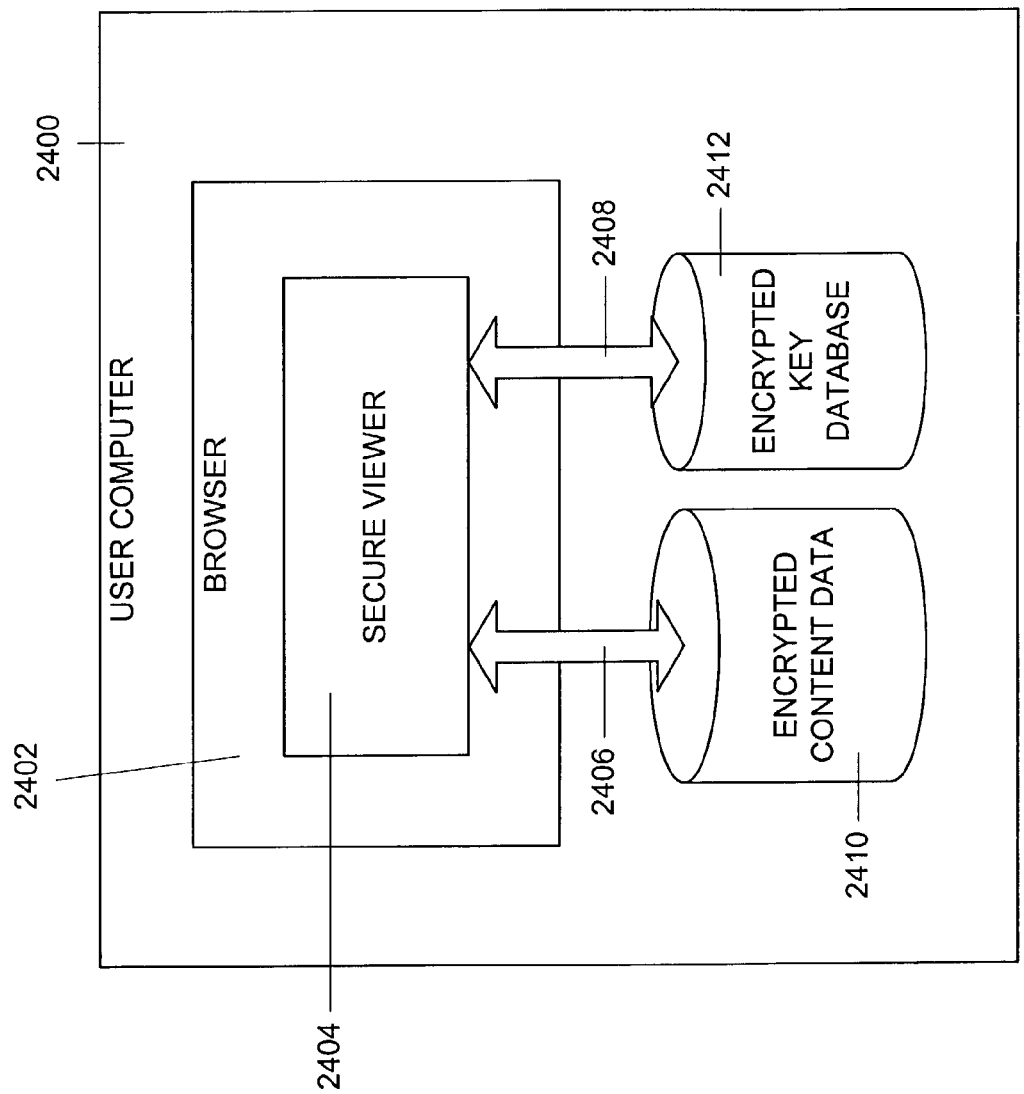
FIG. 24 is a block schematic diagram of yet another embodiment in which encrypted content data, a secure viewer and encrypted decryption keys are stored locally on a user's computer.

Still another embodiment is illustrated in FIG. 24 in which encrypted content data is stored in a local database 2410 on the user's computer 2400. The secure content viewer software 2404 is also stored on the user's computer 2400. Decryption keys along with document identifiers may also be stored in a key database 2412 in encrypted form on the user's computer. For example, the decryption keys may be encrypted with a key that is embedded in the viewer software 2404. Alternatively, the decryption keys may be retrieved from a networked key server (not shown in FIG. 24) as described in the previous embodiment. In response to information from the user identifying a document, the content viewer 2404 reads the encrypted content from the local database 2410, and computes a document identifier from the encrypted content in a manner previously discussed. The viewer 2404 then retrieves an encrypted decryption key from the local key database 2412. The decryption keys are then used to decrypt the encrypted content in the secure viewer software 2404.

A software implementation of the above-described embodiment may comprise a series of computer instructions either fixed on a tangible medium, such as a computer readable media, for example, a diskette, a CD-ROM, a ROM, or a fixed disk, or transmittable to a computer system via a modem or other interface device over a transmission path. The transmission path either may be tangible lines, including but not limited to, optical or analog communications lines, or may be implemented with wireless techniques, including but not limited to microwave, infrared or other transmission techniques. The transmission path may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable medium with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, process operations different from those shown may be performed. Other aspects, such as the specific process flow and the order of the illustrated steps, as well as other modifications to the inventive concept are intended to be covered by the appended claims.

What is claimed is:

1. Apparatus for secure distribution of digital content from a content server over a network to a user running a browser program in a workstation connected to the network, the apparatus comprising:

means for downloading a secure viewer program into the browser;

means in the viewer program for requesting a document containing content from the content server;

means in the content server for downloading an encrypted version of the requested document;

means in the viewer for performing a numerical calculation, using as one input encrypted document content in the encrypted version of the requested document and as another input information that is downloaded with the viewer program, to compute as a result a document identifier that cannot be derived solely from the encrypted version of the requested document and sending the document identifier to the content server;

means in the content server and responsive to the document identifier for downloading a decryption key to the viewer program; and means in the viewer program for decrypting the encrypted version of the document and presenting the document content to the user.

2. The apparatus of claim 1 wherein the secure viewer program comprises an applet that runs in the browser.

3. The apparatus of claim 1 wherein the viewer generates a display area within the browser and wherein the document is presented within the display area.

4. The apparatus of claim 1 wherein the document identifier is computed from the encrypted document content and a text string embedded in the viewer code.

5. The apparatus of claim 1 wherein the content server comprises a key database and wherein the means for downloading a decryption key comprises means for using the document identifier to retrieve the decryption key from the key database.

6. The apparatus of claim 1 further comprising a publishing tool that accepts plaintext documents, encrypts the plaintext documents and generates document identifiers for each encrypted document.

7. The apparatus of claim 6 wherein the publishing tool comprises a file compressor that compresses each document before encrypting the document.

8. The apparatus of claim 6 wherein the content server comprises a key database and wherein the publishing tool comprises a key encryptor that encrypts each decryption key before the each key is stored in the key database.

9. The apparatus of claim 6 wherein the publishing tool computes a document identifier for each encrypted document from the encrypted document content and a text string embedded in the publishing tool code.

10. The apparatus of claim 9 wherein the text string embedded in the viewer code is the same as the text string embedded in the publishing tool code.

11. The apparatus of claim 1 wherein the content server comprises an encrypted document database for storing encrypted versions of documents and means responsive to the document identifier for retrieving the requested document.

12. A method for secure distribution of digital content from a content server over a network to a user running a browser program in a workstation connected to the network, the method comprising:

(a) downloading a secure viewer program into the browser;

(b) sending a request for a document containing content from the viewer program to the content server;

(c) downloading an encrypted version of the requested document from the content server to the viewer;

(d) computing a document identifier in the viewer as a result of a numerical calculation using as one input encrypted content in the encrypted version of the requested document and as another input information that is downloaded with the viewer program, which document identifier cannot be derived solely from the encrypted version of the requested document, and sending the document identifier to the content server;

(e) downloading a decryption key to the viewer program from the content server in response to the document identifier; and (f) decrypting the encrypted version of the document in the viewer program and presenting the document content to the user.

13. The method of claim 12 wherein step (a) comprises downloading a viewer applet that runs in the browser.

14. The method of claim 12 wherein step (f) comprises generating a display area within the browser and presenting the document within the display area.

15. The method of claim 12 wherein step (d) comprises computing the document identifier from the encrypted document content and a text string embedded in the viewer code.

16. The method of claim 12 wherein the content server comprises a key database and wherein step (e) comprises using the document identifier to retrieve the decryption key from the key database.

17. The method of claim 12 further comprising the step of:

(g) encrypting plaintext documents at the content server using a publishing tool and (h) generating document identifiers for each encrypted document.

18. The method of claim 17 wherein step (g) comprises compressing each document before encrypting the document.

19. The method of claim 17 wherein the content server comprises a key database and wherein step (h) comprises encrypting each decryption key and storing the each key in the key database.

20. The method of claim 17 wherein step (h) comprises generating a document identifier for each encrypted document from the encrypted document content and a text string embedded in the publishing tool code.

21. The method of claim 20 wherein the text string embedded in the viewer code is the same as the text string embedded in the publishing tool code.

22. The method of claim 12 wherein the content server comprises an encrypted document database for storing encrypted versions of documents and step (c) comprises retrieving the requested document from the encrypted document database in response to the document identifier.

23. A viewer for a secure digital content distribution system that distributes digital content from a content server over a network to a browser program in a workstation connected to the network, the viewer running in the browser program and comprising:

means for generating in the browser a user interface that does not utilize the functions of the browser user interface, including a display area that is controlled exclusively by the viewer;

means for requesting a document containing content from the content server;

means for receiving an encrypted version of the requested document from the content server;

means for calculating a document identifier as a result of a numerical computation using as one input encrypted content in the encrypted version of the requested document and as another input information that is downloaded with the viewer program, which document identifier cannot be derived solely from the encrypted version of the requested document and sending the document identifier to the content server;

means for receiving a decryption key from the content server and decrypting the encrypted version of the document; and means for presenting the document content to the user in the viewer display area.

24. The viewer of claim 23 wherein the means for generating a user interface comprises an applet that runs in the browser.

25. The viewer of claim 23 wherein the means for calculating the document identifier computes the document identifier from the encrypted document content and a text string embedded in code that implements the viewer.

26. The viewer of claim 25 wherein the means for calculating the document identifier comprises:
a first one-way hashing mechanism that is responsive to the text string for generating a hashed text string;
a second one-way hashing mechanism that is responsive to the encrypted document content for generating hashed document content; and
a third one-way hashing mechanism that is responsive to the hashed text string and the hashed document content for generating the document identifier.

27. The viewer of claim 23 wherein the user interface further comprises:
means for navigating within individual articles; and
means for navigating from article to article.

28. The viewer of claim 23 wherein the user interface further comprises:
means for setting bookmarks to selected articles; and
means for printing selected articles.

29. The viewer of claim 23 wherein the user interface further comprises:
means for communicating with a search engine located within the content server in order to search document content located within the content server.

30. The viewer of claim 23 wherein the user interface further comprises
means for logging various user activities; and
means for communicating logged activities to the content server.

31. A content server for use in a secure distribution system that distributes digital content over a network to a user running a browser program in a workstation connected to the network, the content server comprising:
a publishing tool that accepts plaintext documents, encrypts the plaintext documents and generates document identifiers for each encrypted document wherein each document identifier is calculated for each encrypted document as a result of a numerical computation using as one input the encrypted document content and as another input information that is not part of the encrypted document content, so that the document identifier cannot be derived solely from the encrypted document content;
means for downloading a secure viewer program and the information that is not part of the encrypted document content into the browser;
means responsive to a document request from the viewer program for downloading an encrypted version of the requested document containing encrypted content;
means for receiving a document identifier that is computed in the viewer program as a result of a numerical computation using as one input the encrypted content and as another input the information that was downloaded with the viewer program, but which cannot be derived solely from the encrypted version of the requested document from the viewer program; and
means responsive to the document identifier for downloading a decryption key to the viewer program.

32. The content server of claim 31 further comprising a key database and wherein the means for downloading a decryption key comprises means for using the document identifier to retrieve the decryption key from the key database.

33. The content server of claim 31 wherein the publishing tool comprises a file compressor that compresses each document before encrypting the document.

34. The content server of claim 31 wherein the content server comprises a key database and wherein the publishing tool comprises a key encryptor that encrypts each decryption key before the each key is stored in the key database.

35. The content server of claim 31 wherein the publishing tool comprises means for calculating a document identifier for each encrypted document from the encrypted document content and a text string embedded in the publishing tool code.

36. The content server of claim 35 wherein the means for calculating the document identifier comprises:
a first one-way hashing mechanism that is responsive to the text string for generating a hashed text string;
a second one-way hashing mechanism that is responsive to the encrypted document content for generating hashed document content; and
a third one-way hashing mechanism that is responsive to the hashed text string and the hashed document content for generating the document identifier.

37. The content server of claim 31 further comprising an encrypted document database for storing encrypted versions of documents and means responsive to the document identifier for retrieving the requested document.

* * * * *